United States Patent
Krabbenborg et al.

(10) Patent No.: US 12,251,870 B2
(45) Date of Patent: Mar. 18, 2025

(54) PROCESS TO PREPARE A STRUCTURED ARTICLE USING A REMOVABLE PROTECTIVE LAYER AND STRUCTURED ARTICLE OBTAINED BY SAID PROCESS

(71) Applicant: BASF COATINGS GMBH, Münster (DE)

(72) Inventors: Sven Olle Krabbenborg, Münster (DE); Tim Buscher, Münster (DE)

(73) Assignee: BASF COATINGS GMBH, Muenster (DE)

( * ) Notice: Subject to any disclaimer, the term of this patent is extended or adjusted under 35 U.S.C. 154(b) by 285 days.

(21) Appl. No.: 17/754,005

(22) PCT Filed: Sep. 9, 2020

(86) PCT No.: PCT/EP2020/075170
§ 371 (c)(1),
(2) Date: Mar. 21, 2022

(87) PCT Pub. No.: WO2021/058280
PCT Pub. Date: Apr. 1, 2021

(65) Prior Publication Data
US 2022/0371263 A1    Nov. 24, 2022

(30) Foreign Application Priority Data
Sep. 25, 2019   (EP) ..................... 19199445

(51) Int. Cl.
*B29C 59/02*    (2006.01)

(52) U.S. Cl.
CPC ...... *B29C 59/022* (2013.01); *B29C 2059/023* (2013.01)

(58) Field of Classification Search
CPC . B29C 59/022; B29C 2059/023; B29C 35/02; B29C 35/0805; B29C 41/003; B29C 41/08; B29C 41/38; B29C 41/42; F15D 1/0035; F15D 1/0085; F15D 1/12; B64C 21/10; C09D 4/00; B29L 2031/08; B29L 2031/30; B29L 2031/3475; B29L 2031/747

See application file for complete search history.

(56) References Cited

U.S. PATENT DOCUMENTS

| | | |
|---|---|---|
| 5,731,064 A | 3/1998 | Suss |
| 2004/0126541 A1 | 7/2004 | Dietz et al. |
| 2005/0089673 A1 | 4/2005 | Fleming et al. |
| 2007/0194178 A1 | 8/2007 | Lang et al. |
| 2007/0204953 A1 | 9/2007 | Lin |
| 2010/0282909 A1 | 11/2010 | Rawlings et al. |
| 2015/0268383 A1* | 9/2015 | Domash ............... B05D 1/40 977/782 |
| 2016/0271930 A1 | 9/2016 | Roper et al. |
| 2019/0126532 A1 | 5/2019 | Lanfant et al. |

FOREIGN PATENT DOCUMENTS

| | | |
|---|---|---|
| JP | 2012242803 A | 12/2012 |
| JP | 2013043417 A | 3/2013 |
| RU | 2142882 C1 | 12/1999 |
| WO | 2012006207 A1 | 1/2012 |

OTHER PUBLICATIONS

European Search Report for EP Patent Application No. 19199445.8, Issued on Mar. 18, 2020, 3 pages.
International Search Report and Written Opinion for corresponding PCT/EP2020/075170 mailed Nov. 24, 2020; 12 pages.

* cited by examiner

*Primary Examiner* — Moshe Wilensky
(74) *Attorney, Agent, or Firm* — Armstrong Teasdale LLP

(57) ABSTRACT

Described herein is a process for producing a structured article (A1M1) in which a material (M1) including at least one micro- and/or nanostructured surface (SU1) containing a plurality of micro-scale and/or nano-scale surface elements is covered with an at least partially cured coating layer (C2) to provide a composite (M1C2), said composite (M1C2) is attached to an object (A1) and the coating layer (C2) is at least partially peeled off to provide the structured article (A1M1). Also described herein is a composite (M1C2) in which the surface elements of the material (M1) are covered by a protective coating layer (C2).

18 Claims, No Drawings

PROCESS TO PREPARE A STRUCTURED ARTICLE USING A REMOVABLE PROTECTIVE LAYER AND STRUCTURED ARTICLE OBTAINED BY SAID PROCESS

CROSS-REFERENCE TO RELATED APPLICATIONS

This application is a U.S. National Phase Application of PCT/EP2020/075170, filed Sep. 9, 2020, which claims the benefit of priority to European Patent Application No. 19199445.8, filed Sep. 25, 2019, the entire contents of which are hereby incorporated by reference herein.

The present invention relates to a process for producing a structured article (A1M1) in which a material (M1) comprising at least one micro- and/or nanostructured surface (SU1) containing a plurality of micro-scale and/or nano-scale surface elements is covered with an at least partially cured coating layer (C2) to provide a composite (M1C2), said composite (M1C2) is attached to an object (A1) and the coating layer (C2) is at least partially peeled off to provide the structure article (A1M1). The present invention also relates to a composite (M1C2) in which the surface elements of the structured material (M1) are covered by a protective coating layer (C2).

PRIOR ART

In many applications within industry it is nowadays customary to provide workpieces on their surface with structures whose structural features are in the micrometer range or even in the nanometer range. Such structures are also referred to as microstructures (structures with features in the micrometer range) or nanostructures (structures with features in the nanometer range). Such structures are used, for example, to influence optical, bionic and/or tactile qualities of materials surfaces. Structures of this kind are also referred to as embossments, embossed structures or structured surfaces.

One common method to produce such structured surfaces is to transfer these structures into a coating material. Transfer of the structures into the coating material is frequently achieved with an embossing operation wherein a mold containing the microstructures and/or nanostructures to be formed, in a negative form, is brought into contact with and impressed into the coating material. The coating material is typically cured in situ to obtain permanently formed structures.

Because the direct embossing methods as described above cannot be utilized for large workpieces or objects such as aircraft wings, wind turbine blades, or architectural facing elements, for example, the material which on its surface has a nanometer or micrometer structure is laminated or bonded adhesively the workpiece or object. In order to guarantee a durable bonding of the structured material, the use of pressure, usually in combination with striking movements generating friction forces on the surface, is necessary to permanently attach the structured surfaces to said workpiece or object. Use of pressure usually in combination with striking movements, however, can lead to an at least partial damage of the structured surface, thus resulting in a reduced performance or optical appearance of the surface after attachment to the workpiece or object.

If the attachment of said structured coating is performed at the construction site of the workpiece or object, said structured surfaces have to be packed and transported to the site. This packing and transportation, however, can also result in a damage of the structured surface due to friction forces, impacts or pressure occurring during packaging and transportation.

Structured surfaces therefore require additional packaging and/or protection to maintain the integrity and appearance of the structured surface. It is known in the state of the art to use foils to protect the structured surface. However, the foil generally only covers the protrusions of the surface which hampers its adhesion and therefore the foil can easily glide over said structured surface, making the use of pressure during application difficult without unintentionally removing the foil during attachment of said structured surface to a workpiece or object. Moreover, the reduced adhesion also results in a high risk for damage of the structured surface. Alternatively, foils covered with an adhesive are used. Also here, the adhesion is still often problematic or adhesive residues are left on the structured surface after removal of the foil.

It is also known in the state of the art to use protective coating layers which are applied as liquid coating on the structured surface, cured and removed by dissolution after attachment to an object. However, said protection method is unsuitable if the workpieces or objects are not immersed in a solvent during their ordinary use. The use of solvents, moreover, does decrease the environmental balance of said protective coating layer because additional solvents have to be used to remove the protective layer. Moreover, said method cannot be used if the structured surface needs to be attached to workpieces or objects which are sensitive to solvents, for example electronic components.

Thus, there remains a need to provide a protective coating layer which can be easily applied on the structured surface, leads to excellent protection of the surface during packaging, transport and attachment but at the same time, is easily removable without using special tools or chemicals and does not damage or soil the structured surface.

OBJECT

Therefore, an object of the present invention is to provide a process for preparing a structure article using a structured material wherein the structure of the material is not destroyed during the packaging, transportation and attachment of the structured surface to the article. Said process should be suitable for fabrication of large structured objects or workpieces and should allow attachment of the structured material at the construction site of the object. Additionally, said process should be suitable for a large variety of objects and should lead to an easy attachment of the structured material to the object without the use of specific construction tools or chemicals.

Technical Solution

This problem is solved by the subject matter claimed in the claims and also by the preferred embodiments of that subject matter as described hereinafter.

A first subject of the present invention is therefore a process for preparing a structured article (A1M1), said process comprising the following steps:
 (1) providing a material (M1) comprising at least one micro- and/or nanostructured surface (SU1) containing a plurality of micro-scale and/or nano-scale surface elements;
 (2) applying at least one coating composition (C2a) on the surface (SU1) of the material (M1);

(3) at least partially curing the coating composition (C2a) on the surface (SU1) of the material (M1) to provide composite (M1C2), wherein the dry film thickness of the at least partially cured coating composition (C2) of the composite (M1C2) is at least 5 μm;

(4) at least partially attaching the composite (M1C2) to at least one object (A1) to provide article (A1M1C2); and (5) at least partially peeling off the at least partially cured coating composition (C2) from the article (A1M1C2) to provide the structure article (A1M1).

A further subject matter of the present invention is an composite (M1C2), containing at least one material (M1) comprising at least one micro- and/or nanostructured surface (SU1) containing a plurality of micro-scale and/or nano-scale surface elements and at least one partially cured coating composition (C2), wherein the at least one partially cured coating composition is water-insoluble and wherein the at least partially cured coating layer (C2) does not telegraph the surface elements of the material (M1) to the external surface of the at least partially cured coating composition (C2).

Coating the structured material (M1) with at least one coating layer (C2) results in an easy and effective protection of the structured surface of material (M1). Since the use of a coating composition (C2a) allows a complete coverage of the protrusions and recesses of the structured surface (SU1) of material (M1), the risk of unintentionally removing the protective layer (C2) during attachment of the protected structured material (M1C2) to the object (A1) is significantly reduced when compared to the use of films as protective layers. Moreover, complete coverage of the protrusions and recesses of said structured surface (SU1) results in efficient protection of the surface against shearing forces, impacts and pressure occurring during packaging, storage, transport and attachment of the structured material (M1). The inventive process therefore allows to attach the structured surface permanently, because attachment can be facilitated using pressure and optionally striking movements without damaging the structured surface (SU1) due to the presence of the protective layer. Said protective layer can be easily peeled away after attachment to the object without either removing portions of the structured surface or leaving behind unwanted residues on the structured surface (SU1). Since no solvents are necessary to remove the protective coating (C2), said protected structured material can also be attached to solvent sensitive objects or to objects which cannot be immersed in a solvent in order to remove the protective layer.

DETAILED DESCRIPTION

If reference is made in the context of the present invention to an official standard, this denotes the version of the standard that was current on the filing date, or, if no current version exists at that date, the last current version.

In this description of the invention, for convenience, "polymer" and "resin" are used interchangeably to encompass resins, oligomers, and polymers.

The term "poly(meth)acrylate" stands both for polyacrylates and for polymethacrylates. Poly(meth)acrylates may therefore be constructed of acrylates and/or methacrylates and may contain further ethylenically unsaturated monomers such as, for example, styrene or acrylic acid. The term "acryloyl" and, respectively, "(meth)acryloyl" in the sense of the present invention embraces methacryloyl compounds, acryloyl compounds and mixtures thereof.

In the context of this invention, $C_1$-$C_4$-alkyl means methyl, ethyl, isopropyl, n-propyl, n-butyl, isobutyl, sec-butyl and tert-butyl, preferably methyl, ethyl and n-butyl, more preferably methyl and ethyl and most preferably methyl.

A "structured article" in the sense of the present invention is an article, preferably a workpiece or an assembled product, which comprises at least one surface comprising a plurality of micro-sale and/or nano-scale surface elements. Consequently, the term "object (A1)" is understood to denote a workpiece used to assemble a product or the product itself.

Inventive Process:

Step (1):

In step (1) of the inventive process, a material (M1) comprising at least one micro- and/or nanostructured surface (SU1) containing a plurality of micro-scale and/or nano-scale surface elements is provided. Microstructures here are structures—in terms of structure width and/or of structure height—having characteristics in the micrometer range. Nanostructures here are structures—in terms of structure width and/or of structure height—having characteristics in the nanometer range. Microstructures and nanostructures here are structures which have a structure width in the nanometer range and a structure height in the micrometer range or vice-versa. The terms "structure height" and "structure depth" are interchangeable here. The structure width and structure height of the surface (SU1) are determinable by mechanical scanning of the surface. In this case the structure height is measured at not less than 10 points on a line, distributed uniformly over the width of the sample, taking care to ensure that the scanning instrument does not compress the structured surface.

Production of Material (M1):

The material (M1) provided in step (1) of the inventive process can be prepared by various processes, for example lithographic methods, such as nano-imprint lithography, laser lithography and photo lithography, hot-embossing of polymer films, self-assembly of monolayers and stretching or swelling of polymeric material.

Option 1 Comprising Steps a-i) or a-ii), b) and c)

According to a preferred embodiment of the present invention, the material (M1) provided in step (1) is prepared by transferring the repeating and/or regularly arranged pattern of the embossing tool to a coating composition, curing said coating composition and removing the structured and cured coating composition (i.e. material (M1)) from the embossing tool. Thus, a preferred material (M1) provided in step (1) is obtained by a-i) applying a coating composition (P1a) to a substrate (F1) to provide composite (F1P1a) and at least partially embossing the coating composition (P1a) by means of at least one embossing tool (E2) comprising at least one embossing mold (e2) or a-ii) applying a coating composition (P1a) to at least a part of an at least partially embossed surface of at least one embossing tool (E2) comprising at least one embossing mold (e2) and optionally applying a substrate (F1) and b) at least partially curing the coating composition (P1a) to provide an at least partially embossed coating material optionally comprising the substrate (F1), wherein the coating composition (P1a) is in contact with the embossing tool (E2) during the curing, and c) removing the at least partially embossed coating material optionally comprising the substrate (F1) from the embossing tool (E2) to provide material (M1).

The term "embossing" refers to a process where at least part of the surface of the coating composition (P1a) after step a-i)/a-ii) or at least part of the surface of material (M1) after step b) exhibits an embossed structure. In this case at least a certain area of the coating composition (P1a) or material (M1) is furnished with an embossed structure. Preferably, the entire surface of the coating composition (P1a) or of material (M1) is furnished with an embossed structure. Similar comments apply in connection with the term "embossing" with regard to the at least partially embossed composite (S1C1) employed as embossing molds (e2) of the embossing tool (E2).

The embossing tool (E2) used in step a-i) or a-ii) can either be made of polymeric material or can be a metallic embossing tool and is preferably reusable, i.e. it can be employed repeatedly for transferring at least one embossed structure to the coating composition (P1a). The embossing tool (E2) has a "negative structure" ("negative form"), i.e., the mirror image of the embossed structure which in step a-i) or a-ii) of the method of the invention is transferred onto the coating composition (P1a) and, after implementation of step b), onto the material (M1). The embossing tool (E2) comprises at least one embossing mold (e2). Said embossing mold (e2) can be a polymeric embossing mold (e2) or a metallic embossing mold (e2), preferably a polymeric embossing mold (e2).

Embossing Tool (E2) Comprising Polymeric Embossing Mold (e2):

If an embossing tool (E2) comprising a polymeric embossing mold (e2) is used, it is favorable if a composite (S1C1), comprising a micro- and/or nanostructured surface containing a plurality of micro-scale and/or nano-scale surface elements of a polymeric material (C1) and a substrate (S1) is used as the at least one embossing mold (e2) of the at least one embossing tool (E2). Said composite (S1C1) used in step a-i) or a-ii) is also referred to below as "master substrate". By analogy, the coating (C1) on the master substrate is referred to hereinafter as "at least partially cured master coating" or "master coating layer", and the coating composition (C1a) used for producing the cured master coating is referred to as "master coating".

The composite (S1C1) used as the at least one embossing mold (e2) of the embossing tool (E2) is composed of an at least partially embossed and at least partially cured coating (C1) and substrate (S1). The substrate (S1) thus constitutes a carrier material for the coating composition (C1a) or the cured coating (C1), respectively. Further layers, for example adhesion promoting layers preferably being permeable to UV radiation can be present between (S1) and (C1) in the composite (S1C1). It is favorable, however, if no further layer is present between (S1) and (C1) in the composite (S1C1). The substrate (S1) or, if a coated substrate is used, the layer located on the surface of the substrate (S1) and being in contact with the coating composition (C1a) consists preferably of at least one thermoplastic polymer, selected more particularly from the group consisting of polymethyl (meth)acrylates, polybutyl (meth)acrylates, polyethylene terephthalates (PET), polybutylene terephthalates (PBT), polyvinylidene fluorides, polyvinyl chlorides, polyesters, including polycarbonates and polyvinyl acetate, preferably polyesters such as PBT and PET, polyamides, polyolefins such as polyethylene, polypropylene, polystyrene, and also polybutadiene, polyacrylonitrile, polyacetal, polyacrylonitrile-ethylene-propylene-diene-styrene copolymers (A-EPDM), polyetherimides, phenolic resins, urea resins, melamine resins, alkyd resins, epoxy resins, polyurethanes, including thermoplastic polyurethane (TPU), polyether ketones, polyphenylene sulfides, polyethers, polyvinyl alcohols, and mixtures thereof. Particularly preferred substrates or layers on the surface thereof are polyolefins such as, for example, PP (polypropylene), which may alternatively be isotactic, syndiotactic or atactic and may alternatively be unoriented or oriented through mono- or biaxial drawing, SAN (styrene-acrylonitrile copolymers), PC (polycarbonates), PMMA (polymethyl methacrylates), PBT (poly(butylene terephthalate)s), PA (polyamides), ASA (acrylonitrile-styrene-acrylic ester copolymers) and ABS (acrylonitrile-butadiene-styrene copolymers), and also their physical mixtures (blends). Particularly preferred are PP, SAN, ABS, ASA and also blends of ABS or ASA with PA or PBT or PC. Especially preferred are PET, PBT, PP, PE, and polymethyl methacrylate (PMMA) or impact-modified PMMA. Especially preferred is a polyester, most preferably PET, for use as material for the substrate (S1). Alternatively, the substrate (S1) itself—optionally in spite of a layer of at least one of the aforementioned polymers applied thereto—may be made of a different material such as glass, ceramic, metal, paper and/or fabric. In that case the substrate (S1) is preferably a plate and may be used, for example, in a roll-to-plate (R2P) embossing apparatus. The permeability of the substrate (S1) for radiation is preferably harmonized with the absorption maximum of the least one photoinitiator used in coating composition (C1a).

The thickness of the substrate (S1) is preferably 2 μm up to 5 mm. Particularly preferred is a layer thickness of 25 to 1000 μm, more particularly 50 to 300 μm.

The substrate (S1) is preferably a film, more preferably a film web, very preferably a continuous film web. In that case the substrate (S1) may be used preferably in a roll-to-roll (R2R) embossing apparatus. In the sense of the present invention, the term "continuous film" or "continuous film web" refers preferably to a film having a length of 100 m to 10 km.

The coating composition (C1a) or the master coating preferably comprises
  a) at least one crosslinkable polymer and/or oligomer,
  b) at least one reactive diluent,
  c) at least one photoinitiator and
  d) at least one additive.

The at least one crosslinkable polymer and/or oligomer is preferably selected from (meth)acrylated oligomer or polymer compounds, urethane (meth)acrylates, vinyl (meth)acrylates, epoxy (meth)acrylates, polyester (meth)acrylates, poly(meth)acrylates, polyether (meth)acrylates, polyether (meth)acrylates, olefin (meth)acrylates, (meth)acrylated oils, silicone (meth)acrylates and mixtures thereof, preferably urethane (meth)acrylate oligomers and silicone (meth) acrylates. The term "oligomer" refers to relatively low molecular weight compounds consisting of few, typically less than 10 monomer units. The monomer units may be structurally identical or similar, or they can be different from each other. Oligomeric compounds are typically liquid at room temperature and ambient pressure whereby the dynamic viscosity is preferably less than 500 Pa*s and more preferably less than 200 Pa*s at 23° C. measured according to DIN EN ISO 2555 (Brookfield method). The term "crosslinkable" refers to polymers or oligomers having on average at least one, preferably at least two, pending unsaturated groups capable of forming free radicals for crosslinking reactions. The cross-linkable oligomer and/or polymer compounds are preferably soluble in the one or more reactive diluents.

The master coating (C1a) particularly preferably comprises exactly one crosslinkable polymer and/or oligomer selected from urethane (meth)acrylate oligomers or silicone (meth)acrylate oligomers, especially urethane (meth)acrylate oligomers or silicone (meth)acrylate oligomers comprising on average 2 to 3 unsaturated groups.

Preferred master coatings (C1a) comprise the at least one crosslinkable polymer and/or oligomer in a total amount of 5 to 50 weight %, more preferably 10 to 35 weight %, based on the total weight of the master coating (C1a).

Suitable reactive diluents are polymerizable with the oligomer and/or polymer compounds to form a master substrate comprising a copolymerized elastomeric network of the cured master coating (C1a). The term reactive diluent refers to low weight monomers which are able to participate in a polymerization reaction to form a polymeric material. The weight average molecular weight $M_w$ of such monomer compounds preferably is less than 1000 g/mol and more preferably less than 750 g/mol, as determined by GPC.

Preferably, the reactive diluents are free-radically polymerizable monomers and include, for example, ethylenically-unsaturated monomers such as (meth)acrylates, styrene, vinyl acetate and mixtures thereof. Preferred monomers include (meth)acryloyl-functional monomers such as, for example, alkyl (meth)acrylates, aryloxyalkyl (meth)acrylates, hydroxyalkyl (meth)acrylates, N-vinyl compounds and combinations thereof. Suitable monomers are known to the person skilled in the art and are, for example, listed in WO 2012/006207 A1.

Particularly preferred master coatings (C1a) comprise at least one multifunctional ethylenically unsaturated monomer, i.e. a compound having at least two polymerizable double bonds in one molecule, as reactive diluent in order to increase the crosslinking density. Representative examples of such multifunctional monomers are listed, for example, in WO 2012/006207 A1. Especially preferred reactive diluents are selected from hexane diol diacrylate and/or compounds comprising at least two, preferably precisely three, structural units which may be different from each other or identical of the general formula (I)

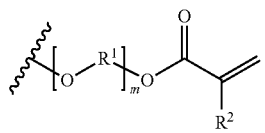

(I)

wherein the radicals $R^1$, independently of each other, are $C_2$-$C_8$ alkylene groups, very preferably $C_2$ alkylene groups, the radicals $R^2$, independently of each other, are H or methyl, and the parameters m, independently of each other, are an integral number in a range from 1 to 15, very preferably from 1 to 4 or 2 to 4, but with the proviso that in at least one of the structural units of the formula (I) the parameter m is at least 2, preferably exactly 2.

All structural units of general formula (I) are attached via the symbol "⌇" to the backbone of said reactive diluent. This bonding preferably takes place preferably via a linking of the oxygen atom of the radical —[O—R$^1$]$_m$— to a carbon atom of the backbone of the component. Thus, the at least two, preferably the at least three, structural units of general formula (I) are present within a single component, namely the reactive diluent b). Suitable backbones are, for example, selected from neopentyl glycol, trimethylolpropane, trimethylolethane or pentaerythritol.

Said compound preferably comprises a total number of ether groups of the general formula "—O—R$^1$—" in a range from 4 to 18, more preferably in a range from 5 to 15, very preferably in a range from 6 to 12. Said compound preferably has a molecular weight ($M_n$) in the range from 300 to 2000 g/mol, more preferably from 400 to 1000 g/mol, as determined by GPC.

Especially preferred compounds comprising at least two structural units of general formula (I) are (meth)acrylates of neopentyl glycol, trimethylolpropane, trimethylolethane or pentaerythritol with a total of 4-fold to 20-fold or of 4-fold to 12-fold alkoxylation, such as ethoxylated, propoxylated or ethoxylated and propoxylated, and more particularly exclusively ethoxylated, neopentyl glycol, trimethylolpropane, trimethylolethane or pentaerythritol. The most preferred are corresponding (meth)acrylates derived from alkoxylated trimethylolpropane.

The master coating preferably comprises a total amount of 40 to 95 weight %, preferably of 55 to 80 weight %, based on the total weight of the coating composition (C1a) of the at least one reactive diluent, preferably of hexane diol diacrylate and/or (meth)acrylates derived from 6-fold ethoxylated trimethylolpropane.

The at least one photoinitiator comprised in the master coating (C1a) is preferably selected from phosphine oxides, benzophenones, α-hydroxyalkyl aryl ketones, thioxanthones, anthraquinones, acetophenones, benzoins and benzoin ethers, ketals, imidazoles or phenylglyoxylic acids and mixtures thereof. Particularly preferred photoinitiators are diphenyl(2,4,6-trimethylbenzoyl)phosphine oxide, ethyl (2,4,6-trimethylbenzoyl)phenylphosphinate, phenylbis(2,4,6-trimethylbenzoyl)phosphine oxide, benzophenone, 1-benzoylcyclohexan-1-ol, 2-hydroxy-2,2-dimethylacetophenone and 2,2-dimethoxy-2-phenylacetophenone and mixtures thereof. The at least one photoinitiator is preferably present in a total amount of 0.01 to 15 weight %, preferably of 0.5 to 10 weight %, based on the total weight of the coating composition (C1a).

The master coating (C1a) can further comprise at least one additive. Said additive is preferably selected from the group consisting of flow control agents, surface-active agents such as surfactants, wetting agents and dispersants, and also thickeners, thixotropic agents, plasticizers, lubricity and antiblocking additives, and mixtures thereof. Examples of commercially available additives are the products Efka® SL 3259, Byk® 377, Tego® Rad 2500, Tego® Rad 2800, Byk® 394, Byk-SILCLEAN 3710, Silixan® A250, Novec FC 4430 and Novec FC 4432. Suitable total amounts of the at least one additive are, for example, 0.01 to 5 weight %, 0.2 or 0.5 to 3 weight %, based on the total weight of the coating composition (C1a).

Particularly preferred master coatings (C1a) thus comprise—based on the total weight of (C1a)—the following components:

10 to 35 weight % of exactly one urethane (meth)acrylate oligomer or silicone (meth)acrylate oligomer comprising on average 2 unsaturated groups, 55 to 80 weight % of hexane diol diacrylate and/or (meth)acrylates derived from 6-fold ethoxylated trimethylolpropane (i.e. compounds comprising three structural units of general formula (I)), 0.5 to 10 weight % of ethyl (2,4,6-trimethylbenzoyl) phenylphosphinate and/or 1-benzoylcyclohexan-1-ol and 0.2 or 0.5 to 3 weight % of a lubricity additive and/or an antiblocking additive.

The double bond conversion of the at least partially cured master coating layer (C1) obtained from (C1a) is preferably at least 70%, more preferably at least 75%, more preferably still at least 80%, very preferably at least 85%, more particularly at least 90%.

The composite (S1C1) used as embossing molds (e2) of embossing tool (E2) can be prepared by application of the radiation-curable composition (C1a) to at least part of a substrate (S1) and curing said composition (C1a). Application of the radiation-curable composition (C1a) is preferably performed on a moving substrate (S1). After application of the coating composition (C1a) to the surface of the moving substrate (S1), an embossing tool (E1) comprising at least one embossing mold (e1), optionally wetted with coating composition (C1a), is preferably pressed at least partly onto the applied coating composition (C1a). The coating composition (C1a) is then at least partially cured by radiation, preferably through the substrate (S1), while being in contact with the at least one embossing mold (e1) in the embossing tool (E1) to transfer microstructures and/or nanostructures as embossed structure onto the at least partially cured coating composition (C1) of the composite (S1C1). Radiation curing may be carried out at elevated temperature, as for example at 30 to 100° C. or up to 80° C. Finally, the composite (S1C1) is removed from the embossing tool (E1). The thickness of the coating (C1) is preferably 0.1 to 500 µm, more preferably 1 to 300 µm.

The structure width of the respective embossed structure in coating (C1) of composite (S1C1) is preferably situated in a range from 10 nm to 500 µm, particularly in a range from 100 nm to 100 µm. The structure height of the respective embossed structure in coating (C1) of composite (S1C1) is situated preferably in a range from 10 nm to 500 µm, particularly in a range from 100 nm to 200 µm.

The apparatus for preparing composite (S1C1) preferably comprises the following means:
(a) a transport means for transporting substrate (S1), preferably a conveyor belt,
(b) means for applying the preferably radiation-curable coating composition (C1a) to at least a part of a surface of the moving substrate (S1),
(c) an embossing tool (E1) comprising at least one embossing mold (e1) being situated preferably downstream of the means for applying the radiation-curable coating composition (C1a), as viewed in the direction of conveying of the substrate (S1),
(d) optionally means for heating, preferably a heating roll mechanism optionally combined with means for IR radiation,
(e) optionally means for cooling, preferably a cooling roll mechanism, and
(f) means for radiation, preferably UV radiation.

The embossing tool (E1) may preferably be an embossing calender, which preferably comprises a grid application mechanism, more preferably a grid roll mechanism. This calender possesses counter-rotating rolls, preferably arranged above one another in the height direction with a certain spacing, and the composite (S1C1a) to be provided with an embossed structure is supplied to the rolls and is guided through the roll nip which forms, with the nip width being variably adjustable. The grid roll mechanism here preferably comprises a first roll such as a metallic roll, as for example a steel roll, a steel roll covered with a metal layer such as a copper layer or a nickel layer optionally containing small amounts of phosphorous, or a roll covered with a nickel sleeve which optionally contains small amounts of phosphorous, and a second roll. The first roll (embossing roll) functions here as the embossing tool (E1) and contains embossing molds (e1) having the negative form of the embossed structure to be embossed into the surface of the composite (S1C1a). The second roll serves as an impression or pressing roll. At the point of the roll nip formed by the counter-rotating rolls disposed with a certain distance from one another, embossing takes place. The embossing tool (E1) used may also be a conventional press cylinder, which carries the negative form of the embossed structure to be embossed into the surface of the composite (S1C1a) and can be pressed onto the composite (S1C1a) for the at least partial embossing. The positive form of the structure to be embossed is produced on the embossing tool (E1) according to the methods customary and known to the skilled person; depending on structure and materials, specific methods may be particularly advantageous. The embossing tool (E1) is preferably a metallic embossing tool, more preferably made of steel, steel covered with a metal layer such as a copper layer or a nickel layer optionally containing small amounts of phosphorous or a roll being covered with a nickel sleeve which optionally contains small amounts of phosphorous, very preferably made of steel covered with a nickel layer optionally containing small amounts of phosphorous. Accordingly, the embossing mold (e1) is preferably metallic, more preferably made of steel, copper or nickel, more particularly made of nickel which contains small amounts of phosphorus. Alternatively, however, soft materials such as polydimethylsiloxanes (PDMS), for example, may also be used for producing molds (e1). Moreover, rolls may be employed that are coated with at least one plastic. Furthermore, the embossing tool (E1) may have a structured coating such as a UV coating as embossing mold (e1).

If curing is performed at elevated temperatures, the composite (S1C1a) runs first through a heating roll mechanism, followed optionally by irradiation with infrared light, before the actual embossing procedure, i.e. the curing while in contact with the embossing tool (E1), takes place. After the embossing and curing, the embossed composite (S1C1) runs optionally through a cooling roll mechanism for cooling. Alternatively, curing may also take place with cooling: in this case, the composite (S1C1a) for embossing runs first through a cooling roll mechanism, before the actual embossing procedure described before takes place. Instead of using a separate heating or curing roll mechanism, it is also possible to heat or cool the embossing tool (E1).

Examples of suitable radiation sources for the radiative curing include low-pressure, medium-pressure and high-pressure mercury emitters and also fluorescent tubes, pulsed emitters, metal halide emitters (halogen lamps), lasers, LEDs and, moreover, electronic flash installations, enabling radiative curing without a photoinitiator, or excimer emitters. Radiative curing takes place through exposure to high-energy radiation, i.e., UV radiation or daylight, or by bombardment with high-energy electrons. The radiation dose typically sufficient for crosslinking in the case of UV curing is in the range from 80 to 3000 mJ/cm$^2$. It is of course also possible to use two or more radiation sources for the curing—two to four, for example. These sources may also each emit in different wavelength ranges.

The composite (S1C1) can be employed as a reusable continuous embossing mold (e2) of the embossing tool (E2) and allows very effective separation between the composite (S1C1) and the structured material (M1) comprising the structured surface (SU1). Additionally, the embossed structure of material (M1) can be obtained with a high molding accuracy and a high success of replication when using said composite (S1C1) as embossing mold (e2).

Metallic Embossing Tool (E2):

If a metallic embossing tool (E2) is used, it is favorable if said embossing tool is selected from copper or nickel embossing tools, more particularly nickel embossing tools which contain small amounts of phosphorous compounds. The structure width and the structure height of the respective embossed structure of the metallic embossing tool is corresponding to the values previously described in connection with the composite (S1C1). According to the invention, it is preferred to use metallic embossing tools (E2) to prepare the structured material (M1).

Step a-i) or a-ii)

According to the first option of step a), i.e. step a-i), of the method to produce material (M1) provided in step (1) of the inventive process a coating composition (P1a) is applied to at least a part of a surface of a substrate (F1) and least partially embossed by means of at least one embossing tool (E2) comprising at least one embossing mold (e2).

According to the second option of step a), i.e. step a-ii), the coating composition (P1a) is applied to at least a part of an at least partially embossed surface of at least one embossing tool (E2) comprising at least one embossing mold (e2) and a substrate (F1) is optionally applied to said coating composition (P1a).

The substrate (F1), or if no substrate (F1) is used the at least one embossing mold (e2), represents a carrier material for the coating composition (P1a) and the resulting cured coating layer. Suitable materials and thicknesses for the substrate (F1) comprise the same materials and thicknesses which have already been mentioned above in connection with substrate (S1). Reference is hereby made explicitly to the corresponding passages. Additionally, substrate (F1) might also be selected from polymeric substrates covered on one side with (i) a one-sided or double-sided adhesive tape optionally comprising a release liner or (ii) a self-adhesive layer or from self-adhesive polymeric substrates. The substrate (F1) is preferably a film, more preferably a film web, very preferably a continuous film web.

Preferably, the at least partial embossing in step a-i) takes place at the level of the roll nip which is formed by the two mutually opposing rolls, rotating counter-directionally or in the same direction, where
- the at least one embossing mold (e2) of the at least one embossing tool (E2) is facing the coating composition (P1a) of the composite (F1P1a) or
- the coating composition (P1a) on at least a part of the at least partially embossed surface of at least one embossing tool (E2) comprising at least one embossing mold (e2) is facing the substrate (F1).

In case a substrate (F1) is used in step a-ii), the at least partial embossing in said step preferably takes place at the level of the roll nip formed by the two mutually opposed rolls, rotating counter-directionally or in the same direction, with the coating composition (P1a) on the at least one embossing mold (e2) of the embossing tool (E2) facing the substrate (F1). The at least partial embossing in this case is achieved preferably by pressing of the substrate (F1) onto the coating composition (P1a) which has been applied on the at least one embossing mold (e2) of the embossing tool (E2).

In case no substrate (F1) is used in step a-ii), the at least partial embossing in said step preferably takes place by pressing the applied coating composition (P1a) onto the at least one embossing mold (e2) of the embossing tool (E2). Said application of pressure can, for example, be achieved by means such as a roll or a grid roll mechanism comprising at least one roll after the application of the coating composition (P1a). The grid roll mechanism here preferably comprises a metallic roll, as for example a steel roll, a steel roll covered with a metal layer, such as a copper layer, a nickel layer optionally containing small amounts of phosphorus, or a roll covered with a nickel sleeve which optionally contains small amounts of phosphorous, or else a quartz-based roll or a roll coated with at least one plastic.

The coating composition (P1a) used in steps a-i) or a-ii) for producing the structured material (M1) is referred to as "product coating". Said product coating composition (P1a) is preferably a physically curable, thermally curable, chemically curable and/or radiation-curable coating composition. With preference, the coating composition (P1a) is a chemically curable, a thermally curable and/or radiation-curable coating composition, more preferably a radiation-curable coating composition. Accordingly, the at least partial curing as per step b) takes place preferably by means of radiation-curing.

Physical curing here refers preferably to the curing of the product coating composition (P1a) by simple evaporation of solvent(s) from said coating composition (P1a). Thermal curing here preferably entails a curing mechanism which is attributable to a temperature above room temperature (>23° C.). This may be, for example, the formation of radicals or ions, preferably radicals from an initiator which breaks down at the elevated temperatures and so initiates a radical or ionic polymerization. Examples of such thermally activatable initiators are those which have a half-life at 80° C. of less than 100 hours. Chemical curing refers preferably to the reaction of at least two different and mutually complementary reactive functional groups, in the manner, for example, of a polycondensation such as a reaction of an —OH group with a —COOH group, or of a polyaddition (reaction of an NCO group with an —OH or amino group). Additionally, chemical curing refers preferably to a curing mechanism which is attributable to a temperature below room temperature (<23° C.), for example by generation of anions or cations using appropriate catalysts. Radiation-curable refers to curing of the product coating composition (P1a) by generation of radicals, preferably by an initiator which is able to generate radicals.

If the coating composition (P1a) is a physically curable, thermally curable and/or chemically curable coating composition, it is prepared using, as binder, at least one customary polymer known to the skilled person. In case of thermally or chemically curable coating compositions, this binder then preferably has crosslinkable functional groups. Any customary crosslinkable functional group known to the skilled person is suitable in this context. More particularly, the crosslinkable functional groups are selected from the group consisting of hydroxyl groups, amino groups, carboxylic acid groups, thiols groups, isocyanates, polyisocyanates and epoxides. The polymers are preferably curable or crosslinkable exothermically or endothermically, preferably in a temperature range from −20° C. up to 250° C., or from 18° C. to 200° C. Especially suitable as polymers are at least one polymer selected from the group consisting of polyurethanes, polyethers, polyesters, polyamides, polyureas, polyvinyl chlorides, polystyrenes, polycarbonates, poly(meth) acrylates, epoxy resins, phenol-formaldehyde resins, melamine-formaldehyde resins. These polymers may in particular be OH-functional. In that case they may be subsumed by the general term "polyols". Such polyols may for example be poly(meth)acrylate polyols, polyester polyols, polyether polyols, polyurethane polyols, polyurea polyols, polyester-polyacrylate polyols, polyester-polyurethane polyols, polyurethane-polyacrylate polyols, polyurethane-modified alkyd resins, fatty acid-modified polyester-polyurethane polyols, and also mixtures of the stated polyols. Preferred are poly(meth)acrylate polyols, polyester polyols and polyether polyols.

It is possible here to use at least one polymer which is cured with participation of isocyanate and/or oligomerized isocyanate groups, very preferably at least one corresponding polyurethane and/or at least one corresponding polyurea (e.g., what are called "polyaspartic binders"). Polyaspartic binders are components which are converted from reaction of amino-functional compounds, especially secondary amines, with isocyanates. If at least one polyurethane is used, then those suitable especially are polyurethane-based resins which are preparable by a polyaddition reaction between hydroxyl-containing components such as polyols and at least one polyisocyanate (aromatic and aliphatic isocyanates, di-, tri- and/or polyisocyanates). Customarily here a stoichiometric reaction of the OH groups in the polyols with the NCO groups in the polyisocyanates is required. However, the stoichiometric ratio to be used can also be varied, since the polyisocyanate can be added to the polyol component in amounts such that there may be an "over crosslinking" or an "under crosslinking". If epoxy resins are used, i.e. epoxide-based resins, then those suitable are preferably epoxide-based resins which are prepared from glycidyl ethers which have terminal epoxide groups and, within the molecule, hydroxyl groups as functional groups. These are preferably reaction products of bisphenol A and epichlorohydrin and/or of bisphenol F with epichlorohydrin, and mixtures thereof, which are also used in the presence of reactive diluents. The curing or crosslinking of such epoxide-based resins is accomplished customarily by a polymerization of the epoxide groups of the epoxide ring, by a polyaddition reaction in the form of an addition reaction of other reactive compounds, as hardeners, in stoichiometric amounts with the epoxide groups, in which case, accordingly, the presence of one active hydrogen equivalent per epoxide group is required (i.e., one H-active equivalent is needed for curing per epoxide equivalent), or by a polycondensation via the epoxide groups and the hydroxyl groups. Examples of suitable hardeners are polyamines, especially (hetero)aliphatic, (hetero)aromatic and (hetero)cycloaliphatic polyamines, polyamidoamines, polyaminoamides, and also polycarboxylic acids and their anhydrides.

The coating composition (P1a) is preferably a radiation-curable coating composition. The terms "radiation-curable" and "radiation-curing" are interchangeable here. The term "radiation-curing" refers preferably to radical polymerization of polymerizable compounds by virtue of electromagnetic and/or particulate radiation, examples being visible to (N)IR light in the wavelength range of $\lambda=400\text{-}1200$ nm, preferably 700-900 nm, and/or UV light in the wavelength range of $\lambda=100$ to 400 nm, preferably of $\lambda=200$ to 400 nm and more preferably $\lambda=250$ to 400 nm, and/or electron radiation in the range from 150 to 300 keV and more preferably with a radiation dose of at least 80, preferably 80 to 3000 mJ/cm$^2$. Radiation curing is carried out with particular preference using UV radiation. The coating composition (P1a) may be cured by use of a suitable radiation source. Consequently, (P1a) is preferably a UV radiation-curing coating composition.

Thus, a preferred product coating composition (P1a) comprises
a) at least one compound having on average at least two unsaturated groups,
b) optionally at least one photoinitiator and
c) optionally at least one additive.

Compound a) preferably has on average at least two unsaturated carbon double bonds, more preferably (meth)acrylic groups. For this purpose, compound a) can be selected from urethane (meth)acrylates, vinyl (meth)acrylates, epoxy (meth)acrylates, polyester (meth)acrylates, poly (meth)acrylates, polyether (meth)acrylates olefin (meth)acrylates, (meth)acrylated oils, silicone (meth)acrylates, unsaturated polyester resins, di- and/or tri-functional (meth)acrylic esters, multifunctionally unsaturated monomers, such as multifunctionally unsaturated (meth)acrylic esters, or mixtures thereof. Said compound a) is preferably present in a total amount of 70 to 99% by weight, preferably 80 to 97% by weight, more preferably 85 to 92% by weight, based on the total weight of the coating composition (P1a).

If curing is effected by means of visible, (N)IR and/or UV light, the coating composition (P1a) preferably comprises at least one photoinitiator which is able to generate polymerization initiating radicals upon irradiation of light having a defined wavelength. In the case of curing with electron radiation, in contrast, the presence of such photoinitiators is not necessary. Suitable photoinitiators are same components as listed above in connection with component (c) of the coating composition (C1a). If present, the photoinitiator is preferably comprised in a total amount of 0,1 to 15% by weight, preferably 0,5 to 10% by weight, very preferably 1 to 8% by weight, based on the total weight of the coating composition (P1a).

The coating composition (P1a) may comprise at least one further additive, moreover. In that case it is possible to use the same components as identified above in connection with component (d) of the coating composition (C1a). The at least one additive is preferably present in a total amount of 0.1 to 10% by weight, preferably 0.3 to 8% by weight, very preferably 0.7 to 4% by weight, based on the total weight of the coating composition (P1a).

Coating composition (P1a) can be a solvent-based or a solid coating composition. In order to facilitate rapid curing and to prevent generation of high amounts of evaporating solvents upon curing, the coating composition (P1a) is preferably a solid coating composition or a coating composition containing a low amount of solvents. Thus, it favorably has solids content of 75 to 100% by weight, based on the total weight of the coating composition (P1a), as determined according to DIN EN ISO 3251:2008-06 at 125° C. and 60 min. Moreover, it favorably comprises a total amount of compounds (a) to (c) of 90 to 100% by weight, more preferably 95 to 100% by weight, based on the total weight of the coating composition (P1a).

Step b)

In step b), the applied coating composition (P1a) is at least partial cured to give an at least partially embossed and partially cured coating material optionally comprising the substrate (F1). The term "at least partially curing" with respect to the coating composition (P1a) is understood to mean the conversion of said coating composition (P1a) to the ready-to-use state, i.e. to a state in which the material (M1) comprising said structured coating (P1) can be used as intended.

Preferably throughout the duration of the at least partial curing in step b), the means used in step a-i) or a-ii) for applying pressure or pressing the applied coating composition (P1a) onto the at least one embossing mold (e2) is in contact with the coating composition (P1a) and/or with the at least partially cured coating formed therefrom.

Steps a-i) or a-ii) and b) are therefore preferably carried out concurrently. In that case the curing in step b) takes place during the implementation of step a-i) or a-ii), preferably in situ, especially if a radiation-curing coating composition is used as coating composition (P1a). Alternatively, and especially if the coating composition (P1a) used is a thermally curing and/or chemically curing coating composition, steps a-i) or a-ii) and b) are carried out temporally after one another.

If a substrate (F1) is used in step a-i) or a-ii), the at least partial curing in step b) is preferably performed by irradiation through the substrate (F1). If no substrate is present in step a-ii) and the composite (S1C1) is used as the at least one embossing mold (e2) of the embossing tool (E2), irradiation is preferably performed through the composite (S1C1) used as substrate. It is advantageous in both cases if the permeability of the substrate (F1) or the substrate (S1) in composite (S1C1) is harmonized with the absorption range of the at least one photoinitiator preferably present in the coating composition (P1a). If no substrate (F1) is present in step a-ii) and the embossing tool (E2) comprises metallic embossing molds (e2), irradiation is preferably performed through the coating composition (P1a).

The corresponding apparatus used in implementing step b) therefore preferably comprises at least one radiation source for irradiating the coating composition (P1a) with a curative radiation. Since the coating composition (P1a) is preferably a UV-curable coating composition, the curative radiation used is preferably UV radiation. If the coating composition (P1a) is not radiation-curable, it is preferably chemically curable. In that case the curing of step b) takes place thermally, by use of suitable thermal radiation sources, for example. Also possible, of course, is combined curing, i.e., thermal curing and curing by means of UV radiation.

Step c)

According to step c) of the first option to produce the structured material (M1) provided in step (1) of the inventive process, the at least partially embossed coating material optionally comprising the substrate (F1) is removed from the embossing tool (E2). After removal from the embossing tool, the material (M1) comprising at least one micro- and/or nanostructured surface (SU1) containing a plurality of micro-scale and/or nano-scale surface elements is obtained is preferably obtained as a free film optionally comprising the substrate (F1). The material (M1) has on its surface, which has been in contact with the embossing molds (e2), at least partially the negative mirror image of the embossing molds (e2) of the embossing tool (E2). The embossing tool (E2) is restored in step c).

Said removal from the embossing tool can, for example, be performed by peeling the at least partially embossed coating material optionally comprising the substrate (F1) from the embossing tool (E2) or vice versa. Peeling can either be done manually or be using commonly known mechanical dividing means.

Alternatively, the removal from the embossing tool (E2) can comprise the following steps:
  c-1i) applying at least one adhesive layer (AL) on at least a part of the unstructured surface of the at least partially embossed coating material or
  c-1 ii) applying at least one adhesive layer (AL) on the substrate (F1) not being in contact with the at least partially embossed coating material, and
  c-2) removing, preferably peeling, material (M1) comprising the at least one adhesive layer (AL) from the embossing tool (E2) or vice versa.

The adhesive layer (AL) can, for example, be a laminating adhesive, such as a polyacrylate or a polyacrylate-based adhesive. However, the adhesive layer (AL) is preferably a self-adhesive layer or a multi-layer construction. Such multi-layer constructions comprise, for example, a middle polymer layer (PL) also called in-liner, which is coated with an adhesive (AH) on both surfaces. Said adhesive (AH) may each be a polyacrylate or a polyacrylate-based adhesive. In principle, any type of polymer can be used to prepare the middle polymer layer (PL). Examples of such polymers are poly(meth)acrylates, polyesters such as PET and/or PBT, polyvinylidene fluorides, polyvinylchlorides, polyamides and/or polyolefins. In particular, a polyester such as PET can be used. The layer thickness of the polymer layer (PL) may be in a range from 5 to 55 µm, preferably from 6 to 50 µm, more preferably from 7 to 40 µm, in particular from 8 to 30 µm. Each adhesive (AH) may initially be covered by a release liner, such as silicone paper, for better handling. However, prior to use as an adhesive layer (AL) in the step c-i) one of the two release liners is removed. The other release liner is preferably removed in a later step of the inventive process, more preferably before attaching the composite (M1C2) to the a least one object (A1).

Steps c-1i) or c-1 ii) and c-2) can either be performed manually or by a machine comprising at least one transportation means for the adhesive layer (AL), at least one pressurizing means for applying pressure to fix the adhesive layer (AL) on at least a part of the unstructured surface of the at least partially embossed coating material or on the substrate (F1) not being in contact with the at least partially embossed coating material and at least one dividing means for removing, preferably peeling, the material (M1) from the embossing tool (E2) or vice-versa.

The apparatus used in the method to prepare material (M1) comprising steps a-i) or a-ii), b) and c) according to option 1 is preferably corresponding to the apparatus described above in connection with the preparation of composite (S1C1), i.e. a roll-to-roll embossing apparatus. If no substrate (F1) is present in step a-ii) said apparatus does, however, not comprise a means for transporting the substrate (F1).

Option 2:

Apart from option 1 comprising process steps a-i) or a-ii), b) and c), the material (M1) provided in step (1) of the inventive method can be prepared by other processes. Preferably, the material (M1) provided in step (1) is selected from (i) hot-embossed polymeric materials, preferably hot-embossed polymeric films; (ii) self-assembled monolayers; (iii) materials having at least one micro- and/or nanostructured surface (SU1) prepared by laser and/or photo lithography; and (iv) polymeric materials having at least one micro- and/or nanostructured surface (SU1) prepared by an external stimulus.

In hot-embossing processes, polymeric materials, in particular polymeric films, are heated to temperatures above their glass transition temperature, the respective structure is pressed into the liquified polymer film by female or male molds, the embossed polymer film is cooled and demolded. Suitable materials (M1) can also be prepared by microthermoforming where thermoplastic polymer films are three-dimensionally stretched and heated before the mold is applied to the film. In contrast to hot-embossing methods, the polymer film is only softened but still in the solid state.

Preparation of structured materials (M1), especially wrinkled polymer films, is also possible by applying an external stimulus. The external stimulus can, for example, be selected from thermal variations, stretching, releasing and swelling or oxidation. During thermal variations, i.e. heating and cooling, a mismatch of the thermal expansion coefficient between the substrate and the polymer layer occurs leading to a buckling of the surface layer and the formation of wrinkles on said surface. The generated wrinkles are normally randomly distributed on the surface. Wrinkles can also be created by mechanical stretching/compression involving a uniaxial strain followed by film deposition and/or chemical modification. Upon stress relaxation, wrinkles are formed at the surface of the polymeric material due to the disparity in Young's modulus between the rigid top layer and the polymeric substrate. Said wrinkles are typically aligned orthogonally to the axis of the deformation. Wrinkle formation upon swelling can be induced by immersing a layered polymer film in solvent vapor or a monomer solution. Wrinkles can also be formed by chemical modification, for example oxidation, of the surface of the polymer film.

The material (M1) provided in step (1) of the inventive process is preferably prepared according to option 1, i.e., the afore-described process comprising steps a-i) or a-ii), b) and c).

Features of Material (M1)

The material (M1) provided in step (1) of the inventive process and preferably prepared according to option 1 previously described comprises at least one micro- and/or nanostructured surface (SU1) containing a plurality of micro-scale and/or nano-scale surface elements. Said surface (SU1) preferably comprises a repeating and/or regularly arranged pattern or are completely randomized. The structure in each case may be a continuous embossed structure such as a continuous groove structure or else a plurality of preferably repeating individual embossed structures. The respective individual embossed structures in this case may in turn be based preferably on a groove structure having more or less strongly pronounced protrusions defining the embossed height of the embossed structure. In accordance with the respective geometry of the ridges of a preferably repeating individual embossed structure, a plan view may show a multiplicity of preferably repeating individual embossed structures, each of them different, such as, for example, preferably serpentine, sawtooth, hexagonal, diamond-shape, rhomboidal, parallelogrammatical, honeycomb, circular, punctiform, star-shaped, rope-shaped, reticular, polygonal, preferably triangular, tetragonal, more preferably rectangular and square, pentagonal, hexagonal, heptagonal and octagonal, wire-shaped, ellipsoidal, oval and lattice-shape patterns, it also being possible for at least two patterns to be superimposed on one another. The protrusions of the individual embossed structures may also have a curvature, i.e., a convex and/or concave structure.

The respective embossed structure (SU1) may be described by its width such as the width of the ridges, in other words by its structure width, and by the height of the embossments, in other words by its structure height (or structure depth). The structure width such as the width of the ridges may have a length of up to one centimeter, but is preferably situated in a range from 10 nm to 1 mm. The structure height is situated preferably in a range from 0.1 nm to 1 mm. Preferably, however, the respective embossed structure represents a microstructure and/or nanostructure.

The size of a specific micro-scale or nano-scale surface element, respectively, is defined as its maximum extension in any direction parallel to the surface, i.e., for example, as the diameter of a cylindrical surface element or the diagonal of the base surface of a pyramidal surface element. In case of surface elements having a macro-scale extension in one or more directions within the surface (or parallel to the surface) and a micro- or nano-scale extension in one or more other directions within the surface, the term size of the surface elements refers to the micro- and/or nano-scale extension of such surface elements. The length of a specific micro-scale or nano-scale surface element, respectively, is defined as its extension in the direction of the length of the structured surface. Likewise, the width of a specific micro-scale or nano-scale surface element, respectively, is defined as its extension in the direction of the width of the structured surface.

The height of a protruding (or elevating) surface element is defined by its respective extension as measured from the adjacent bottom surface on which the respective protruding surface element is arranged in the direction perpendicular to such bottom surface. Likewise, the depth of a surface element extending downwardly from an adjacent top exposed surface is defined by its respective downward extension as measured from the adjacent top surface from which the indentation extends, in the direction perpendicular to such top surface.

The distance between two adjacent surface elements is defined as the distance between two maxima or two relative maxima, respectively, between such surface elements in a direction within the structured surface. Structured surfaces having a regular sequence of surface elements in one or more given direction parallel to the surface can be characterized by one or more pitch lengths in such directions. In a certain direction parallel to the surface the term pitch length denotes the distance between corresponding points of two adjacent, regularly repetitive surface elements. This may be illustrated for a structured surfaces comprising an alternating sequence of channel- and rail-type surface elements surface elements which both macroscopically extend, essentially parallel to each other, in a first longitudinal direction and which each have a micro- and, optionally, nano-scale cross-section normal to said longitudinal direction). The pitch length of such structured surface normal to the longitudinal direction is the sum of the width of the channel-type surface element and the width of the rail-type surface element in such normal direction.

The micro-scale and/or nano-scale surface elements of the surface (SU1) of the material (M1) each preferably have a structure width of 10 nm to 500 µm, more preferably 25 nm to 400 µm, even more preferably 50 nm to 250 µm, very preferably 100 nm to 100 µm. The structure height of the respective micro-scale and/or nano-scale surface elements of the surface (SU1) of the material (M1) is situated preferably in a range from 10 nm to 500 µm, more preferably 25 nm to 400 µm, even more preferably 50 nm to 300 µm, very preferably 100 nm to 200 µm.

The structure width and structure height of the respective surface (SU1) are preferably determined by production of a cross section of the surface (SU1) and determination of the structure height and structure width of said cross section by means of an optical microscopy.

Step (2):

In step (2) of the inventive process, a coating composition (C2a) is applied on the surface (SU1) of the material (M1). Said coating composition (C2a) is forming—after partial curing in step (3)—a protective layer on the structured surface (SU1) of the material (M1). The coating composition (C2a) is therefore also called "protective coating composition (C2a)". By analogy, the cured coating composition (C2) resulting after step (3) is called "protective coating layer (C2)".

The protective coating composition (C2a) applied in step (2) of the inventive process is preferably selected from radiation-curable coating compositions, physically curing coating compositions, chemically curing coating compositions, melts and mixtures thereof. Surprisingly, a wide variety of protective coating compositions (C2a) can be used in step (2), thus rendering the inventive process highly flexible and easily customizable to different needs in terms of curing the protective coating composition (C2a).

According to a particularly preferred embodiment of step (2), the protective coating composition (C2a) is applied in a thickness that is sufficient to result in the dry film thickness after curing as stated below. This ensures an effective protection of the structured surface.

The coating composition (C2a) applied in step (2) of the inventive process is preferably a liquid or a highly viscous composition. This allows to effectively fill the recessions and protrusions of the structured surface (SU1) of material (M1), thus reducing undesired inclusion of air and preventing detachment of the cured protective layer upon attachment of the protected material (M1C2) to the object (A1). If the coating composition (C2a) is a radiation-curable coating composition, a physically curing coating composition or a chemically curing coating composition, it preferably has a viscosity at 23° C. of 1 to 500,000 mPa*s, more preferably 25 to 100,000 mPa*s, even more preferably 50 to 50,000 mPa*s, particularly 80 to 9,000 mPa*s, particularly preferably 90 to 3,000 mPa*s, especially 100 to 2,000 mPa*s, as determined according to DIN 53019-1:2008-09, DIN 53019-2:2001-02, DIN 53019-3:2008-09 and DIN 53019-4:2016-10.

If the coating composition (C2a) is a melt, for example a TPU melt, it preferably has a glass transition temperature of 20 to −60° C., more preferably of 0 to −45° C., determined by dynamic scanning calorimetry (DSC) according to DIN EN ISO 11357-2:2014-07 with a heating rate of 10 K/min.

Step (3):

According to step (3) of the inventive process, the protective coating composition (C2a) applied in step (2) on the surface (SU1) of material (M1) is at least partially cured to provide composite (M1C2).

The term "at least partially curing" of the protective coating composition (C2a) is understood to mean the conversion of such a film formed from such coating composition to the ready-to-use state, i.e. to a state in which the material (M1) provided with the at least partially cured coating (C2) can be transported, stored and used as intended. More particularly, the cured coating (C2) is no longer soft or tacky, but has been conditioned as a solid coating film which does not undergo any further significant change in its properties, such as hardness or adhesion on the substrate, even under further exposure to curing conditions as described below.

The cured coating composition (C2) within composite (M1C2) has a dry film thickness of at least 5 μm. The dry film thickness of the cured coating layer (C2) is preferably 5 to 1,000 μm, more preferably 6 to 900 μm, even more preferably from 7 to 700 μm, particularly from 8 to 500 μm, particularly preferably from 9 to 400 μm, especially from 10 to 300 μm, as determined according to DIN EN ISO 2808:2007-05, procedure 12A. The dry film thickness in the sense of the present invention preferably denotes the film thickness of the dry film above the protrusions of the micro-scale and/or nano-scale surface elements of the surface (SU1). On the one hand, said dry film thickness is sufficient to result in a fully covered structured surface (SU1), i.e. the recessions and protrusions of the surface (SU1) are fully covered by the coating composition (C2).

Even though the micro-scale and/or nano-scale surface elements of the surface (SU1) are fully covered by the protective coating layer (C2), they might not necessarily be fully wetted by said coating layer (C2). This allows to tune the adhesion of the protective coating layer (C2) to the structured surface and thus also the force necessary for its removal. On the other hand, said dry film thickness is sufficient to support the protective layer when it is removed so that it can be removed without destruction of said layer or the structured surface (SU1) and without leaving behind unwanted residues on the structured surface. This allows an effective protection of the surface (SU1) of the material (M1) because the whole surface is covered by the protective coating layer (C2). Of course, it is also possible to only partially cover the micro-scale and/or nano-scale surface elements of the surface (SU1) with the coating layer (C2), i.e. at least a part of the protruding surface elements is not covered by the protective coating layer (C2) after the at least partial curing of said coating layer. This, however, is not preferred according to the present invention.

After at least partial curing, the structured surface of material (M1), preferably the protrusions of the surface elements of the structured surface of material (M1), is preferably fully covered with the protective coating layer (C2). Said protective coating layer results in an effective protection of the structured material (M1) during packaging, storing, transport and attachment of the structured material to an object (A1), especially if pressure and/or striking movements are necessary to ensure a durable attachment to the object. In contrast to using solid foils, the use of a liquid coating composition allows to fill the structured surface (SU1) of material (M1) and to better tune the adhesion to as well as the removal of the structured surface (SU1). After curing, the use of shearing forces during packaging, storing, transport and attachment does not lead to unwanted detachment of the protective layer (C2) or damage of the structured surface (SU1) of material (M1).

In order to allow easy and residue-free removal of the at least partially cured protective coating (C2) in step (5) of the inventive method, said cured coating (C2) preferably has an elongation at break of more than 1%. In particular, the cured coating composition (C2) has an elongation at break of 5 to 3,000%, more preferably 10 to 1,000%, even more preferably 25 to 500%, particularly preferably 50 to 200% or 75 to 175% or 100 to 150%, especially of 10 to 100%, as measured according to DIN EN ISO 527-1:2012-06 and DIN EN ISO 527-2:2012-06. A further preferred range is from 5 to 300%.

It has been found that it is favorable if the cured coating composition (C2) has a specific glass transition temperature $T_g$. Thus, the cured coating composition (C2) favorably has a glass transition temperature $T_g$ of −100 to 100° C., preferably −75 to 75° C., more preferably −50 to 50° C., even more preferably from −35 to 35° C., particularly preferably from −25 to 25° C. or from −15 to 15° C. or from −10 to 10° C. or 0° C., especially from 25 to 50° C. Dynamic mechanical properties including glass transition temperature $T_g$ were analyzed using tensile vibration in the non-resonance mode at a frequency of 1 Hz, with an amplitude of 0.005 mm, with a heating rate of 2 K/m in from −50° C. to 200° C. according to DIN EN ISO 6721-4:2019-05. Use of protective coating layers (C2) having said glass transition temperatures $T_g$ lead to improved separation of the coating layer (C2) from the structure (M1) attached to the object (A1) and thus reduces the damage or contamination of the structured surface (SU1) of the material (M1) upon peeling of the coating layer (C2) in step (5).

The cured coating composition (C2) favorably has a surface energy of 5 to 80 mJ/cm$^2$, preferably 10 to 75 mJ/cm$^2$, more preferably 15 to 70 mJ/cm$^2$, even more preferably 20 to 65 mJ/cm$^2$, particularly preferably 30 to 40 mJ/cm$^2$, especially 21 mJ/cm$^2$ or 22 mJ/cm$^2$ or 23 mJ/cm$^2$ or 24 or mJ/cm$^2$ or 25 mJ/cm$^2$ or 26 mJ/cm$^2$ or 27 mJ/cm$^2$ or 28 mJ/cm$^2$ or 29 mJ/cm$^2$, as measured according to DIN EN 55660-1:2011-12, DIN EN 55660-2:2011-12 and DIN EN 55660-3:2011-12. Use of cured coating compositions comprising said surface energies results in improved separation of the cured coating layer (C2) from the material (M1) attached to the object (A1) but does not result in unintentional removal of the protective coating layer (C2) during packaging, storage, transport or attachment to the object (A1).

Step (4):

In step (4) of the inventive method, the composite (M1C2) is at least partially attached to an object (A1) to provide article (A1M1C2). In the sense of the present invention, the term "partially attachment" also includes the build-in of the composite (M1C2) into an article (A1). At least partial attachment of composite (M1C2) to an object (A1) can be achieved, for example, by use of adhesive layers or by welding. Additionally, attachment can also be facilitated by previous attachment of the composite (M1C2) to a mounting system which is then attached to the object (A1).

In order to facilitate an endurable attachment to the at least one object, the composite (M1C2) preferably comprises at least one adhesive layer attached to the opposite side of protective coating (C2), i.e. to the material (M1) not covered with coating (C2). If the material (M1) does not already contain at least one adhesive layer (AL), said at least one adhesive layer (AL) is preferably attached to the composite (M1C2) prior to attachment of said composite (M1C2) to at least one object. Suitable materials for the adhesive layer (AL) have already been mentioned above in connection with steps c-i) and c-ii). Reference is hereby made explicitly to the corresponding passages.

Before attaching the composite (M1C2) or (ALM1C2) to at least one object (A1), it can be preferred to at least partially peel of the coating composition (C2) before at least partially attaching said composite (M1C2) or (ALM1C2) to the at least one object (A1). This is especially favorable if it is easier to attach said composite to object (A1) if part of the coating (C2) has been peeled off prior to attachment to the object (A1). However, the coating composition (C2) is not completely peeled of before attachment to the object (A1) in order to allow sufficient protection of the surface (SU1) of the structured material (M1).

If the size of the composite (M1C2) or (ALM1C2) is not corresponding to the size of the surface of the object (A1) which should be structured with material (M1), said composite (M1C2) or (ALM1C2) can be cut to the desired size prior to attachment to the at least one object. This is especially preferred if objects (A1) of varying sizes should be covered with the structured material (M1) or to improve interlocking of the structured material if larger areas need to be covered. Due to the presence of the protection layer (C2), material (M1) can be cut without unnecessary destruction of the structured surface (SU1). With respect to this embodiment, it is also possible to first cut composite (M1C2) to the desired size before attaching an adhesive layer (AL) to the unstructured side of material (M1) and subsequent application of the cut composite (ALM1C2) to the object (A1).

Suitable objects (A1) can be made of various materials, including metal, plastic, reinforced materials, glass, rubber, fabric, leather, paper, wood and mixtures thereof. Preferably, the at least one object (A1) is selected from the group consisting of surfaces being in contact with liquids and gases, such as airplanes, ships and cars, rotor blades, drilling platforms, pipelines, lighting systems, displays, photovoltaic modules, structural elements and decorative elements.

Step (5):

According to step (5) of the inventive method, the protective coating layer (C2) is at least partially, preferably completely, peeled from the article (A1M1C2) to provide the structured article (A1M1). Said protective coating layer (C2) can be peeled away from the article (A1) easily, without destruction of the structured surface (SU1) and without leaving significant residues, preferably without leaving any residues, on the structured surface (SU1).

The result after the end of step (5) of the process of the invention is a structured article (A1M1). Since the structured surface is not destroyed during the attachment of the structured material to the article and a durable attachment of large areas of structured material (M1) is easily facilitated, the structured article (A1M1) resulting from the inventive process comprises a repeating and/or regularly arranged pattern of high quality.

Inventive Composite (M1C2):

The inventive composite (M1C2) contains at least one material (M1) which is protected by an at least partially cured coating layer (C2) and is preferably obtained after step (3) of the inventive process described above. In order to facilitate attachment of the composite (M1C2) to the surface of an article (A1), the object may comprise an adhesive layer (AL) as previously disclosed in connection with step (4) of the inventive method on the surface of the material (M1) not being in contact with coating layer (C2).

The material (M1) comprises at least one micro- and/or nanostructured surface (SU1) containing a plurality of micro-scale and/or nano-scale surface elements and is therefore structured. Said structure of the material (M1) is protected by an at least partially cured coating composition (C2) which is applied on the material (M1) and subsequently partially cured. Said coating composition (C2) is water-insoluble and does not telegraph the surface elements of the material (M1) to the external surface of the at least partially cured coating composition (C2). The term "water-insoluble" refers to partially cured coating layers which cannot be fully removed, i.e. without leaving behind detectable residues on the surface of material (M1), by immersion of the object (M1C2) into an aqueous solution, preferably water, at temperatures of 4 to 35° C. The term "does not telegraph the surface elements of material (M1) to the external surface of the at least partially cured coating composition (C2)" is understood to mean—in the context of the present invention—that the at least partially cured coating layer (C2) has a dry film thickness that is sufficiently large such that the structure of the material (M1) is not transferred to the surface of the coating layer (C2). Thus, the at least partially cured coating layer (C2) has a sufficiently high dry film thickness to fully cover all protrusions and recessions of the material (M1). Preferably, the surface of the at least partially cured coating layer (C2) is therefore substantially flat. This allows to easily stack the inventive composite (M1C2) during storage and transportation and easily attach the inventive composite (M1C2) or (ALM1C2) onto objects (A1).

With respect to suitable materials (M1), partially cured coating layers (C2) and further layers being present, reference is made to the materials (M1), coating compositions (C2a), partially cured coating layers (C2) and adhesive layers (AL) described in connection with the inventive process.

What has been said about the process according to the invention, especially with respect to the structured material (M1) and the coating composition (C2) applies mutatis mutandis with respect to further preferred embodiments of the object (M1C2) of the present invention.

The invention is described in particular by the following embodiments:

Embodiment 1: Process for preparing a structured article (A1M1), said process comprising the following steps:
 (1) providing a material (M1) comprising at least one micro- and/or nanostructured surface (SU1) containing a plurality of micro-scale and/or nano-scale surface elements;
 (2) applying at least one coating composition (C2a) on the surface (SU1) of the material (M1);
 (3) at least partially curing the coating composition (C2a) on the surface (SU1) of the material (M1) to provide composite (M1C2), wherein the dry film thickness of the at least partially cured coating composition (C2) of the composite (M1C2) is at least 5 μm;
 (4) at least partially attaching the composite (M1C2) to at least one object (A1) to provide article (A1M1C2); and
 (5) at least partially peeling off the at least partially cured coating composition (C2) from the article (A1M1C2) to provide the structure article (A1M1).

Embodiment 2: process according to embodiment 1, wherein the material (M1) provided in step (1) is obtained by
 a-i) applying a coating composition (P1a) to a substrate (F1) to provide composite (F1P1a) and at least partially embossing the coating composition (P1a) by means of at least one embossing tool (E2) comprising at least one embossing mold (e2) or
 a-ii) applying a coating composition (P1a) to at least a part of at least an partially embossed surface of at least one embossing tool (E2) comprising at least one embossing mold (e2) and optionally applying a substrate (F1), and
 b) at least partially curing the coating composition (P1a) to provide an at least partially embossed coating material optionally comprising the substrate (F1), wherein the coating composition (P1a) is in contact with the embossing tool (E2) during the curing, and
 c) removing the at least partially embossed coating material optionally comprising the substrate (F1) from the embossing tool (E2) to provide material (M1).

Embodiment 3: process according to embodiment 2, wherein a composite (S1C1), comprising a micro- and/or nanostructured surface containing a plurality of micro-scale and/or nano-scale surface elements of a polymeric material (C1) and a substrate (S1) is used as the at least one embossing mold (e2) of the at least one embossing tool (E2).

Embodiment 4: Process according to embodiments 2 or 3, wherein the substrate (S1) is a selected from the group consisting of polymethyl (meth)acrylates, polybutyl (meth)acrylates, polyethylene terephthalates, polybutylene terephthalates, polyvinylidene fluorides, polyvinyl chlorides, polyesters, polycarbonates, polyvinyl acetate, polyamides, polyolefins, polyacrylonitrile, polyacetal, polyacrylonitrile-ethylene-propylene-diene-styrene copolymers (A-EPDM), polyetherimides, phenolic resins, urea resins, melamine resins, alkyd resins, epoxy resins, polyurethanes, polyether ketones, polyphenylene sulfides, polyethers, polyvinyl alcohols and mixtures thereof, preferably polyethylenterephthalat, poly(butylene terephthalate), polypropylene, polyethylene, polymethyl methacrylate (PMMA) or impact-modified PMMA.

Embodiment 5: process according to any of embodiments 2 to 4, wherein the thickness of the substrate (S1) is 2 μm to 5 mm, preferably 25 to 1000 μm, very preferably 50 to 300 μm.

Embodiment 6: process according to any of embodiments 2 to 5, wherein the coating composition (C1a) comprises
 (a) at least one crosslinkable polymer and/or oligomer,
 (b) at least one reactive diluent,
 (c) at least one photoinitiator and
 (d) optionally at least one additive.

Embodiment 7: process according to any of embodiments 2 to 6, wherein the coating composition (C1a) comprises— based on the total weight of (C1a):
 (a) 10 to 35 weight % of exactly one urethane (meth)acrylate oligomer or silicone (meth)acrylate oligomer comprising on average 2 unsaturated groups,
 (b) 55 to 80 weight % of hexane diol diacrylate and/or (meth)acrylates derived from 6-fold ethoxylated trimethylolpropane,
 (c) 0.5 to 10 weight % of ethyl (2,4,6-trimethylbenzoyl) phenylphosphinate and/or 1-benzoylcyclohexan-1-ol and
 (d) 0.2 or 0.5 to 3 weight % of a lubricity additive and/or an antiblocking additive.

Embodiment 8: process according to embodiment 2, wherein the embossing tool (E2) comprising at least one embossing mold (e2) is selected from metallic embossing tools, more preferably from embossing tools made of steel, steel covered with a metal layer such as a copper layer or a nickel layer optionally containing small amounts of phosphorous or a roll being covered with a nickel sleeve which optionally contains small amounts of phosphorous, very preferably made of a roll being covered with a nickel layer optionally containing small amounts of phosphorous.

Embodiment 9: process according to any of embodiments 2 to 8, wherein the at least partial embossing in step a-i) takes place at the level of the roll nip which is formed by the two mutually opposing rolls, rotating counter-directionally or in the same direction, where
 the at least one embossing mold (e2) of the at least one embossing tool (E2) is facing the coating composition (P1a) of the composite (F1P1a) or
 the coating composition (P1a) on at least a part of the at least partially embossed surface of at least one embossing tool (E2) comprising at least one embossing mold (e2) is facing the substrate (F1).

Embodiment 10: process according to any of embodiments 2 to 9, wherein the coating composition (P1a) is preferably a physically drying, thermally curable, chemically curable and/or radiation-curable coating composition, more preferably a chemically, thermally and/or radiation-curable coating composition, very preferably a radiation-curable coating composition.

Embodiment 11: process according to any of embodiments 2 to 10, wherein the coating composition (P1a) comprises
 (a) at least one compound having on average at least two unsaturated groups,
 (b) optionally at least one photoinitiator and
 (c) optionally at least one additive.

Embodiment 12: process according to embodiment 11, wherein the coating composition (P1a) comprises the at least one compound a) in a total amount of 70 to 99% by weight, preferably 80 to 97% by weight, more preferably 85 to 92% by weight, based on the total weight of the coating composition (P1a).

Embodiment 13: process according to embodiment 11 or 12, wherein the coating composition (P1a) comprises the at least one photoinitiator in a total amount of 0.1 to 15% by weight, preferably 0.5 to 10% by weight, very preferably 1 to 8% by weight, based on the total weight of the coating composition (P1a).

Embodiment 14: process according to any of embodiments 11 to 13, wherein the coating composition (P1a) comprises the at least one additive in a total amount of 0.1 to 10% by weight, preferably 0.3 to 8% by weight, very preferably 0.7 to 4% by weight, based on the total weight of the coating composition (P1a).

Embodiment 15: process according to any of embodiments 2 to 14, wherein the coating composition (P1a) has a solids content of 90 to 100% by weight, based on the total weight of the coating composition (P1a), as determined according to DIN EN ISO 3251:2008-06 at 130° C. and 60 min.

Embodiment 16: process according to any of the embodiments 2 to 15, wherein the substrate (F1) is a selected from the (i) polymeric substrates such as polymethyl (meth)acrylates, polybutyl (meth)acrylates, polyethylene terephthalates, polybutylene terephthalates, polyvinylidene fluorides, polyvinyl chlorides, polyesters, polycarbonates, polyvinyl acetate, polyamides, polyolefins, polyacrylonitrile, polyacetal, polyacrylonitrile-ethylene-propylene-diene-styrene copolymers (A-EPDM), polyetherimides, phenolic resins, urea resins, melamine resins, alkyd resins, epoxy resins, polyurethanes, polyether ketones, polyphenylene sulfides, polyethers, polyvinyl alcohols and mixtures thereof; (ii) polymeric substrates covered on one side with a double-sided adhesive tape optionally comprising a release liner or with a self-adhesive layer; and (iii) self-adhesive substrates; preferably polyethylenterephthalat, poly(butylene terephthalate), polypropylene, polyethylene, polymethyl methacrylate (PMMA) or impact-modified PMMA.

Embodiment 17: process according to any of the embodiments 2 to 16, wherein the thickness of the substrate (F1) is 2 μm to 5 mm, preferably 25 to 1000 μm, very preferably 50 to 300 μm.

Embodiment 18: process according to any of the embodiments 2 to 17, wherein the substrate (F1) is a film, preferably a film web, very preferably a continuous film web.

Embodiment 19: process according to any of the embodiments 2 to 18, wherein removal of the at least partially embossed coating material optionally comprising the substrate (F1) is performed by peeling.

Embodiment 20: Process according to any of the embodiments 2 to 19, wherein removal of the at least partially embossed coating material optionally comprising the substrate (F1) comprises the following steps:
- c-1i) applying at least one adhesive layer (AL) on at least a part of the unstructured surface of the at least partially embossed coating material or
- c-1ii) applying at least one adhesive layer (AL) on the substrate (F1) not being in contact with the at least partially embossed coating material and
- c-2) removing, preferably peeling, material (M1) comprising the at least one adhesive layer (AL) from the embossing tool (E2) or vice versa.

Embodiment 21: process according to embodiment 1, wherein the material (M1) provided in step (1) is selected from (i) hot-embossed polymeric materials, preferably hot-embossed polymeric films; (ii) self-assembled monolayers; (iii) materials having at least one micro- and/or nanostructured surface (SU1) prepared by laser and/or photo lithography; and (iv) polymeric materials having at least one micro- and/or nanostructured surface (SU1) prepared by an external stimulus.

Embodiment 22: process according to any of the preceding embodiments, wherein the micro-scale and/or nano-scale surface elements of the surface (SU1) of the material (M1) each have a structure width of 10 nm to 500 μm, preferably 25 nm to 400 μm, more preferably 50 nm to 250 μm, very preferably 100 nm to 100 μm.

Embodiment 23: process according to any of the preceding embodiments, wherein the micro-scale and/or nano-scale surface elements of the surface (SU1) of the material (M1) each have a structure height of 10 nm to 500 μm, preferably 25 nm to 400 μm, more preferably 50 nm to 300 μm, very preferably 100 nm to 200 μm.

Embodiment 24: process according to any of the preceding embodiments, wherein coating composition (C2a) is selected from radiation-curable coating compositions, physically curing coating compositions, chemically curing coating compositions, melts and mixtures thereof.

Embodiment 25: process according to any of the preceding embodiments, wherein coating composition (C2a) has a viscosity at 23° C. of 1 to 500,000 mPa*s, preferably 25 to 100,000 mPa*s, more preferably 50 to 50,000 mPa*s, even more preferably 80 to 9,000 mPa*s, particularly preferably 90 to 3,000 mPa*s, especially 100 to 2,000 mPa*s, as determined according to DIN 53019-1:2008-09, DIN 53019-2:2001-02, DIN 53019-3:2008-09 and DIN 53019-4:2016-10.

Embodiment 26: process according to any of embodiments 1 to 24, wherein the coating composition (C2a) has a glass transition temperature of 20 to −60° C., preferably of 0 to −45° C., determined by dynamic scanning calorimetry (DSC) according to DIN EN ISO 11357-2:2014-07 with a heating rate of 10 K/min.

Embodiment 27: process according to any of the preceding embodiments, wherein the cured coating composition (C2) has a dry film thickness of 5 to 1,000 μm, preferably 6 to 900 μm, more preferably from 7 to 700 μm, even more preferably from 8 to 500 μm, particularly preferably from 9 to 400 μm, especially from 10 to 300 μm.

Embodiment 28: process according to any of the preceding embodiments, wherein the cured coating composition (C2) has an elongation at break of more than 1%, preferably 5 to 3,000%, more preferably 10 to 1,000%, even more preferably 25 to 500%, particularly preferably 50 to 200% or 75 to 175% or 100 to 150%, especially of 10 to 100%, as measured according to DIN EN ISO 527-1:2012-06 and DIN EN ISO 527-2:2012-06.

Embodiment 29: process according to any of the preceding embodiments, wherein the cured coating composition (C2) has a glass transition temperature $T_g$ of −100 to 100° C., preferably −75 to 75° C., more preferably −50 to 50° C., even more preferably from −35 to 35° C., particularly preferably from −25 to 25° C. or from −15 to 15° C. or from −10 to 10° C., especially 0° C., measured by tensile vibration in the non-resonance mode at a frequency of 1 Hz with an amplitude of 0.005 mm and a heating rate of 2 K/min according to DIN EN ISO 6721-4:2013-05.

Embodiment 30: process according to any of the preceding embodiments, wherein the cured coating composition (C2) has a surface energy of 5 to 80 mJ/cm², preferably 10 to 75 mJ/cm², more preferably 15 to 70 mJ/cm², even more preferably 20 to 65 mJ/cm$^2$, particularly preferably 30 to 40 mJ/cm$^2$, especially 21 mJ/cm$^2$ or 22 mJ/cm$^2$ or 23 mJ/cm$^2$ or 24 or mJ/cm$^2$ or 25 mJ/cm$^2$ or 26 mJ/cm$^2$ or 27 mJ/cm$^2$ or 28 mJ/cm$^2$ or 29 mJ/cm$^2$, as measured according to DIN 55660-1:2011-12, DIN 55660-2:2011-12 and DIN 55660-3: 2011-12.

Embodiment 31: process according to any of embodiments 1 to 19 and 21 to 30, wherein at least one adhesive layer (AL) is attached to the composite (M1C2) prior to attachment of said composite (M1C2) to at least one object.

Embodiment 32: process according to any of the preceding embodiments, wherein the cured coating composition (C2) is at least partially peeled off from the composite (M1C2) or (ALM1C2) before at least partially attaching said composite (M1C2) or (ALM1C2) to the at least one object (A1).

Embodiment 33: process according to any of the preceding embodiments, wherein the composite (M1C2) or (ALM1C2) is cut into the desired size before at least partially attaching said composite (M1C2) or (ALM1C2) to the at least one object (A1).

Embodiment 34: process according to any of the preceding embodiments, wherein the object (A1) is selected from the group consisting of surfaces being in contact with liquids and gases, such as airplanes, ships and cars, rotor blades, drilling platforms, pipelines, lighting systems, displays, photovoltaic modules, structural elements and decorative elements.

Embodiment 35: Composite (M1C2) containing:
at least one material (M1) comprising at least one micro- and/or nanostructured surface (SU1) containing a plurality of micro-scale and/or nano-scale surface elements and
at least one partially cured coating composition (C2), wherein the at least one partially cured coating composition is water-insoluble and wherein the at least partially cured coating layer (C2) does not telegraph the surface elements of the material (M1) to the external surface of the at least partially cured coating composition (C2).

EXAMPLES

The present invention will now be explained in greater detail using working examples, but the present invention is in no way limited to these working examples. Moreover, the terms "parts", "%" and "ratio" in the examples denote "parts by mass", "mass %" and "mass ratio" respectively unless otherwise indicated.

1) Methods of Determination:

1.1 Solids Content (Solids, Nonvolatile Fraction)

The nonvolatile fraction (the solids or solids content) is determined according to DIN EN ISO 3251 (date: June 2008). The method involves weighing out 1 g of sample into an aluminum tray that has been dried beforehand and drying the sample in a drying cabinet at 125° C. for 60 minutes, cooling it in a desiccator, and then reweighing it. The residue, relative to the total amount of sample employed, corresponds to the nonvolatile fraction.

1.2. Determining the Success of Removal of Coating (C2)

The success of removal of coating (C2) is determined by peeling of coating (C2) from composite (M1C2) and visually assessing the peeled coating layer (C2) as well as structured product (M1). If the coating layer (C2) could be fully removed and the product (M1) was not visibly damaged, the peeling behavior of the coating layer (C2) is rated "OK". If the coating layer (C2) was intact after removal via peeling, the film stability of the coating layer (C2) is rated "OK". If the coating layer (C2) could not be removed or the product (M1) was destroyed during peeling, the peeling behavior of the coating layer (C2) is rated "not OK". If the coating layer (C2) was destroyed during removal via peeling, the film stability of the coating layer (C2) is rated "not OK".

1.3. Determination of Residues of Coating (C2) on Structured Surface After Removal of Coating (C2):

The residues of coating (C2) remaining on the structured surface (SU1) were determined by scanning electron microscopy. Images of the structured product (M1) were recorded with magnifications of up to 1000× before application of the protective coating (C2a) and after removal of the cured coating layer (C2). If the structured surface (SU1) showed no visual additional residues and/or abrasion using a 1000× magnification after removal of cured coating layer (C2) in comparison to the surface (SU1) before application of the protective coating (C2a), the rating is "No". If the structured surface (SU1) showed visual additional residues and/or abrasion using a 1000× magnification after removal of cured coating layer (C2) in comparison to the surface (SU1) before application of the protective coating (C2a), the rating is "Yes".

1.4. Determination of Dry Film Thickness Above the Structured Surface (SU1):

The dry film thickness above the structured surface (SU1) was determined by means of an ElektroPhysik MiniTest® 2100 microprocessor coating thickness gauge in combination with the F1.6 probe (measuring uncertainty: ±(1%+1 μm)) in accordance with DIN EN ISO 2808 (date: May 2007), procedure 12A. In the absence of a ferromagnetic substrate, the measurement was conducted by placing the samples on an even ferromagnetic plate. The thickness of the protected composite (M1C2) was measured and compared to the thickness of material (M1). The thickness of the material (M1) was determined by measuring the thickness at the protrusions of the material (M1). The dry film thickness above the structured surface (SU1) was determined as the difference in thickness between composite (M1C2) and material (M1).

1.5. Determination of Flexibility

The flexibility of the respective composite (M1C2) was determined by folding it 180°. If no visual cracks and/or damages within the protective coating (C2) were observed during and/or after folding, the rating is "OK". If visual cracks and/or damages within the protective coating (C2) were observed during and/or after folding, the rating is "not OK".

2) Preparation of Structured Products (M1-1) to (M1-4) (Step (1) of Inventive Process)

2.1. Coating Compositions (P1a-1) to (P1a-4)

For preparation of different structured materials (M1-1) to (M1-4), the following coating compositions (P1a-1) to (P1a-4) were used:

Coating composition (P1a) comprises the following components—based on the total weight of (P1a)—
13.8% by weight Laromer UA 9033 (aliphatic urethane acrylate containing on average 2 unsaturated groups, 70% solution in trimethylolpropane formal acrylate; available from BASF SE),
64.2% by weight of SR 499 ((trimethylolpropane triacrylate) with 6-fold ethoxylation; available from Sartomer Arkema Group),
13.8% by weight hexanediol diacrylate (HDDA),
1.0% by weight Tego Rad 2500 (silicone acrylate, lubricity and antiblocking additive available from Evonik), 3.6% by weight of Irgacure TPO-L (ethyl (2,4,6-trimethylbenzoyl) phenylphosphinate, commercially available photoinitiator from BASF SE) and 3.6% by weight of Irgacure 184 (1-benzoylcyclohexane-1-ol, commercially available photoinitiator from BASF SE).

Coating composition (P1a-2) is a commercially available, radiation-curing coating composition comprising at least one urethane (meth)acrylate, at least multifunctional ethylenically unsaturated monomer (i.e. reactive diluent), at least one photoinitiator and commercial additives.

Coating composition (P1a-3) is a commercially available, radiation-curing coating composition comprising at least one urethane (meth)acrylate, at least multifunctional ethylenically unsaturated monomer (i.e. reactive diluent), at least one photoinitiator, at least one pigment and commercial additives.

Coating composition (P1a-4) is a commercially available, radiation-curing coating composition comprising at least one urethane (meth)acrylate, at least multifunctional ethylenically unsaturated monomer (i.e. reactive diluent), at least one photoinitiator and at least one UV absorber.

2.2. Production of Structured Products (M1-1) to (M1-5) Using Coating Compositions (P1a-1) to (P1a-4)

2.2.1 Structured Product (M1-1):

The structured product (M1-1) was prepared by using a roll-to-roll embossing apparatus having a gap formed by an embossing tool (E2) bearing a nickel mold (e2) with a tiles structure (continuous two-dimensional triangular structure with a width of 43 μm and a height of 10 μm) and a further roll positioned opposite the embossing tool. After the coating composition (P1a-1) listed in point 2.1 above is applied in a layer thickness of 20 μm on a PET film (Hostaphan® GN, layer thickness of 125 μm) (F1), the resulting stack of film (F1) and coating composition (P1a-1) (i.e. composite (F1P1a-1) is passed through the gap formed by the embossing tool (E2) and the further roller and, while the mold (e2) of the embossing tool (E2) is still in contact with the coating composition (P1a-1) of the stack, the coating composition (P1a-1) is at least partly cured by means of a UV-LED lamp. The UV-LED lamp used in this case is a 365 nm, 13 W/cm² UV-LED lamp from Heraeus (100% lamp power, 5 m/min). The composite (F1P1-1) is subsequently separated from the embossing apparatus to provide material (M1-1). The material (M1-1) is subsequently post-exposed to a UVA lamp (Panacol-Elosal UV F-900) to obtain material (M1-1) having a microstructured surface (SU1) containing a plurality of micro-scale surface elements in the form of tiles.

2.2.2 Structured Products (M1-2) to (M1-5):

Structured products (M1-2) to (M1-5) were prepared as described in point 2.2.1 using the embossing tools (E2) having an embossing mold (e2) with different negative structures stated below. Table 1 gives an overview of prepared structured products (M1-1) to (M1-5).

Microstructures of Embossing Mold (e2) of the Embossing Tool (E2):

microstructure A has a negative riblet structure with a depth of 42 μm, microstructure B has a negative riblet structure with a depth of 60 μm, microstructure C has a negative conical structure with a depth of 85 μm, and microstructure D has a negative pyramidal structure with a depth of 65 μm.

TABLE 1

Microstructures and coating compositions (P1a) used to prepare structured products (M1-2) to (M1-5):

| Product | Microstructure | Coating composition (P1a) |
| --- | --- | --- |
| (M1-1) | Tiles | (P1a-1) |
| (M1-2) | Microstructure A | (P1a-2) |
| (M1-3) | Microstructure B | (P1a-2) |
| (M1-4) | Microstructure C | (P1a-3) |
| (M1-5) | Microstructure D | (P1a-4) |

3) Application and Curing of Protective Coating (C2a) (Steps (2) and (3) of the Inventive Process)

3.1. Composition of Coating Compositions (C2a)

The following coating compositions (C2a-1) to (C2a-3) were used as protective coating composition (C2a) (all amounts are based on the total weight of the respective coating composition)

UV-Curable Coating Composition (C2a-1):

77.5% by weight CN 966H90 (Aliphatic polyester based urethane diacrylate oligomer blended with 10% 2(2-ethoxyethoxy) ethyl acrylate; available from Sartomer Arkema Group), 16.7% by weight hexanediol diacrylate (HDDA)

2.9% by weight by weight of Irgacure TPO-L (ethyl (2,4,6-trimethylbenzoyl) phenylphosphinate, commercially available photoinitiator from BASF SE) and 2.9% by weight Irgacure 184 (1-benzoylcyclohexane-1-ol, commercially available photoinitiator from BASF SE).

Physically Curing Coating Composition (C2a-2):

100% by weight Daotan-TW-1236/40WANEP (Aqueous aliphatic polyurethane dispersion based on polycarbonate, 40% in water/1-ethyl-2-pyrrolidone; available from Allnex Belgium S.A.)

Melt (C2a-3):

100% by weight Elastollan 1185-A10 (Thermoplastic polyether polyurethane elastomer; available from BASF SE, $T_g$ of −40° C. (determined according to DIN EN ISO 11357-2:2014-07 with a heating rate of 10 K/min)).

3.2. Application and Curing of Coating Compositions (C2a)

The respective coating compositions (C2a) according to point 3.1 were applied to the respective products (M1-1) to (M1-5) in the wet layer thicknesses stated in Table 2:

TABLE 2 wet layer thicknesses of respective coating compositions (C2a) on structured materials (M1-1) to (M1-5)

| Composite (M1C2) | Structured material (M1) | Coating composition (C2a) | Wet layer thickness [μm] |
| --- | --- | --- | --- |
| 1 | (M1-1) | (C2a-1) | 220 |
| 2 | (M1-1) | (C2a-2) | 500 |
| 3 | (M1-1) | (C2a-2) | 300 |
| 4 | (M1-1) | (C2a-2) | 100 |
| 5 | (M1-1) | (C2a-3) | 130 |
| 6 | (M1-2) | (C2a-1) | 300 |
| 7 | (M1-2) | (C2a-2) | 1000 |
| 8 | (M1-2) | (C2a-2) | 500 |
| 9 | (M1-2) | (C2a-2) | 300 |
| 10 | (M1-3) | (C2a-2) | 500 |
| 11 | (M1-3) | (C2a-2) | 300 |
| 12 | (M1-4) | (C2a-1) | 250 |
| 13 | (M1-5) | (C2a-2) | 500 |
| 14 | (M1-5) | (C2a-2) | 300 |

At least partial curing of the respective protective coatings (C2a-1) to (C2a-3) was performed as follows:

Curing of the UV-curable coating composition (C2a-1) was performed using a roll-to-plate apparatus. For this purpose, the coating composition (C2a-1) was applied in a wet film thickness of approximately 350 µm and was covered with a protective layer (non-primed PET film, Hostaphan®, layer thickness of 125 µm). The resulting film stack is pressed against the plate by use of a rubber roller while the coating composition (C2a-1) is at least partly cured by means of a UV-LED lamp. The lamp is a 365 nm UV-LED lamp from Heraeus (100% lamp power, 10 W/cm$^2$, 5 m/min, 5 cm distance between lamp and coating composition (C2a-1)).

The physically curable coating composition (C2a-2) is cured for 30 minutes at a temperature of 80° C.

Coating composition (C2a-3) in the form of a TPU melt was applied on the structured material (M1-1) using a roll-to-roll apparatus. For this purpose, the TPU was extruded at a nozzle temperature of 200° C. and directly pressed onto the structured material (M1-1) at the roll nip formed by opposite rolls of the roll-to-roll apparatus. Curing took place by passive cooling of the resulting composite (M1-1C2a-3) to room temperature while guiding it through the apparatus.

After curing, the dry film thickness above the protrusions of the structural elements of the surface (SU1), the flexibility and the film stability were evaluated as previously described. The obtained values are listed in Table 3:

TABLE 3

Dry film thickness above structure, flexibility and film stability after curing

| Composite (M1C2) | Dry film thickness [µm] | Flexibility | Film stability |
| --- | --- | --- | --- |
| 1 | 200-220 | OK | OK |
| 2 | 145 | OK | OK |
| 3 | 80 | OK | OK |
| 4 | 10 | OK | OK |
| 5 | 120 | OK | OK |
| 6 | 250-300 | OK | OK |
| 7 | 310 | OK | OK |
| 8 | 105 | OK | OK |
| 9 | 50 | OK | OK |
| 10 | 110 | OK | OK |
| 11 | 50 | OK | OK |
| 12 | 230-250 | OK | OK |
| 13 | 150 | OK | OK |
| 14 | 80 | OK | OK |

After curing, the respective coating composition (C2) fully covers the protrusions and recessions of the structured surface (SU1) of each material (M1). Additionally, the presence of the protective coating (C2) does not negatively impair the flexibility and film stability of the respective composite (M1C1). Thus, the use of the protective coating layer does not negatively influence the handling of the protected structured material (M1).

4) Attachment of Respective Compositions (M1C2-1) to (M1C2-2) to Object (A1) and Peeling of Protective Coating Layer (C2)

A double-sided adhesive tape (mount laminating film S-4705 WSA 120P from ATP; polyacrylate) was attached to the opposite side of coating composition (C2-1), (C2-2) or (C2-3) of composites No. 1 to 14 prepared in point 3.2. For this purpose, the silicone paper is first of all peeled from one adhesive side and, parallel to the direction of peeling of the silicone paper, the adhesive film is brought, with its now exposed adhesive side, onto the side opposite of protective layer (C2) of the respective composite (M1C2), by pressing the adhesive film onto M1 with a rubber roller. Similarly, then, the silicone paper is peeled off from the other side and, parallel to the direction of peeling of the silicone paper, the adhesive film is pressed onto a surface of the steel plate (corresponding to object (A1)) using a rubber roller. The respective protective coating (C2-1) to (C2-3) is peeled away by hand from the resulting composite (A1M1C2). The peeling behavior as well as the obtained structured surface (SU1) of material (M1) attached to object (A1) was evaluated as previously described. The following results were obtained.

TABLE 4

Peeling behavior and properties of structured surface after peeling

| Composite (M1C2) | Peeling behavior of coating (C2) | Residues of coating (C2) on surface (SU1) | Damage of surface (SU1) |
| --- | --- | --- | --- |
| 1 | OK | No | No |
| 2 | OK | No | No |
| 3 | OK | No | No |
| 4 | OK | No | No |
| 5 | OK | No | No |
| 6 | OK | No | No |
| 7 | OK | No | No |
| 8 | OK | No | No |
| 9 | OK | No | No |
| 10 | OK | No | No |
| 11 | OK | No | No |
| 12 | OK | No | No |
| 13 | OK | No | No |
| 14 | OK | No | No |

From table 4, it is evident that a structured surface (SU1) containing a plurality of micro-scale and/or nano-scale surface elements can be effectively protected by using a liquid coating composition that is at least partially cured. A sufficient protection of the structured surface (SU1) was obtained irrespective of the type of coating composition (C2a) and material (M1), thus rendering the inventive process flexible with respect to the protective coating composition (C2a) and structured material (M1). The protective coating layer (C2) can be easily removed via peeling by hand without tearing, without leaving any residues on the structured surface (SU1) and without destruction of the structured surface.

The invention claimed is:

1. A process for preparing a structured article (A1M1), said process comprising the following steps:
   (1) providing a material (M1) comprising at least one micro- and/or nanostructured surface (SU1) containing a plurality of micro-scale and/or nano-scale surface elements;
   (2) applying at least one coating composition (C2a) on the surface (SU1) of the material (M1);
   (3) at least partially curing the coating composition (C2a) on the surface (SU1) of the material (M1) to provide a composite (M1C2), wherein a dry film thickness of the at least partially cured coating composition (C2) of the composite (M1C2) is at least 5 µm;
   (4) at least partially attaching the composite (M1C2) to at least one object (A1) to provide an article (A1M1C2); and
   (5) at least partially peeling off the at least partially cured coating composition (C2) from the article (A1M1C2) to provide the structure article (A1M1), wherein the material (M1) provided in step (1) is obtained by a-i) applying a coating composition (P1a) to a substrate (F1) to provide a composite (F1P1a) and at least partially embossing the coating composition (P1a) using at least one embossing tool (E2) comprising at least one embossing mold (e2)

(6) or a-ii) applying a coating composition (P1a) to at least a part of an at least partially embossed surface of at least one embossing tool (E2) comprising at least one embossing mold (e2) and optionally applying a substrate (F1)

and b) at least partially curing the coating composition (P1a) to provide an at least partially embossed coating material optionally comprising the substrate (F1), wherein the coating composition (P1a) is in contact with the embossing tool (E2) during the curing, and c) removing the at least partially embossed coating material optionally comprising the substrate (F1) from the embossing tool (E2) to provide the material (M1).

2. The process according to claim 1, wherein the coating composition (P1a) is a physically drying, thermally curable, chemically curable and/or radiation-curable coating composition.

3. The process according to claim 1, wherein the coating composition (P1a) comprises
   a) at least one compound having at least two unsaturated groups,
   b) optionally at least one photoinitiator and
   c) optionally at least one additive.

4. The process according to claim 1, wherein removal of the at least partially embossed coating material is performed by peeling.

5. The process according to claim 1, wherein removal of the at least partially embossed coating material comprises the following steps:
   c-1i) applying at least one adhesive layer (AL) on at least a part of an unstructured surface of the at least partially embossed coating material
   or
   c-1ii) applying at least one adhesive layer (AL) on the substrate (F1) not being in contact with the at least partially embossed coating material
   and
   c-2) removing material (M1) comprising the at least one adhesive layer (AL) from the embossing tool (E2) or vice versa.

6. The process according to claim 1, wherein the micro-scale and/or nano-scale surface elements of the surface (SU1) of the material (M1) each have a structure width of 10 nm to 500 µm.

7. The process according to claim 1, wherein the micro-scale and/or nano-scale surface elements of the surface (SU1) of the material (M1) each have a structure height of 10 nm to 500 µm.

8. The process according to claim 1, wherein the coating composition (C2a) is selected from the group consisting of UV-curable coating compositions, physically drying coating compositions, thermally curing coating compositions, melts and mixtures thereof.

9. The process according to claim 1, wherein the coating composition (C2a) has a viscosity at 23° C. of 1 to 500,000 mPa*s, as determined according to DIN 53019-1:2008-09, DIN 53019-2:2001-02, DIN 53019-3:2008-09 and DIN 53019-4:2016-10.

10. The process according to claim 1, wherein the cured coating composition (C2) has a dry film thickness of 5 to 1,000 µm.

11. The process according to claim 1, wherein the cured coating composition (C2) has an elongation at break of more than 1%, as measured according to DIN EN ISO 527-1:2012-06 and DIN EN ISO 527-2:2012-06.

12. The process according to claim 1, wherein the cured coating composition (C2) has a glass transition temperature Tg of −100 to 100° C., measured by tensile vibration in the non-resonance mode at a frequency of 1 Hz with an amplitude of 0.005 mm and a heating rate of 2 K/min according to DIN EN ISO 6721-4:2013-05.

13. The process according to claim 1, wherein the cured coating composition (C2) has a surface energy of 5 to 80 mJ/cm$^2$, as measured according to DIN EN ISO 527-1:2012-06 and DIN EN ISO 527-2:2012-06.

14. The process according to claim 1, wherein removal of the at least partially embossed coating material comprises the following steps:
   c-1i) applying at least one adhesive layer (AL) on at least a part of an unstructured surface of the at least partially embossed coating material
   or
   c-1ii) applying at least one adhesive layer (AL) on the substrate (F1) not being in contact with the at least partially embossed coating material
   and
   c-2) peeling material (M1) comprising the at least one adhesive layer (AL) from the embossing tool (E2) or vice versa.

15. The process according to claim 1, wherein the micro-scale and/or nano-scale surface elements of the surface (SU1) of the material (M1) each have a structure width of 25 nm to 400 µm.

16. The process according to claim 1, wherein the micro-scale and/or nano-scale surface elements of the surface (SU1) of the material (M1) each have a structure height of 25 nm to 400 µm.

17. The process according to claim 1, wherein the cured coating composition (C2) has a dry film thickness of 6 to 900 µm.

18. The process according to claim 1, wherein the cured coating composition (C2) has an elongation at break of 5 to 3,000%, as measured according to DIN EN ISO 527-1:2012-06 and DIN EN ISO 527-2:2012-06.

* * * * *